United States Patent
Gerber et al.

(10) Patent No.: US 8,363,894 B2
(45) Date of Patent: Jan. 29, 2013

(54) APPARATUS AND METHOD FOR IMPLEMENTING A TOUCHLESS SLIDER

(75) Inventors: Stephen C. Gerber, Austin, TX (US); Wayne T. Holcombe, Mountain View, CA (US); Miroslav Svajda, San Jose, CA (US)

(73) Assignee: Silicon Laboratories Inc., Austin, TX (US)

( * ) Notice: Subject to any disclaimer, the term of this patent is extended or adjusted under 35 U.S.C. 154(b) by 578 days.

(21) Appl. No.: 12/570,625

(22) Filed: Sep. 30, 2009

(65) Prior Publication Data

US 2011/0019205 A1    Jan. 27, 2011

Related U.S. Application Data

(63) Continuation-in-part of application No. 12/334,296, filed on Dec. 12, 2008.

(60) Provisional application No. 61/219,614, filed on Jun. 23, 2009.

(51) Int. Cl.
*G06K 9/00* (2006.01)
(52) U.S. Cl. ....................................................... 382/103
(58) Field of Classification Search .................... 382/103
See application file for complete search history.

(56) References Cited

U.S. PATENT DOCUMENTS

| | | | | |
|---|---|---|---|---|
| 6,144,366 A * | 11/2000 | Numazaki et al. | ............ | 345/156 |
| 7,486,386 B1 * | 2/2009 | Holcombe et al. | ............ | 356/4.01 |
| 8,009,045 B2 * | 8/2011 | Cehelnik | ........................ | 340/561 |
| 2006/0244733 A1 * | 11/2006 | Geaghan | ........................ | 345/173 |
| 2007/0214462 A1 * | 9/2007 | Boillot | .......................... | 719/328 |
| 2008/0111710 A1 * | 5/2008 | Boillot | ............................ | 341/22 |
| 2008/0259051 A1 * | 10/2008 | Ota | ................................. | 345/175 |
| 2010/0001955 A1 * | 1/2010 | Richter | ........................... | 345/163 |

* cited by examiner

*Primary Examiner* — Vikkram Bali

(57) ABSTRACT

A method for gesture recognition in an optical system using a touchless slider is shown. The touchless slider has first and second reference points positioned along an axis in an optical system. The method includes obtaining a plurality of first and second reflectance values by measuring an amplitude of light reflected from an object relative to the first and second reference points, respectively, wherein each first and second reflectance value corresponds to a different point in time. The plurality of first and second reflectance values are compared to identify a plurality of ratio values between the first and second reflectance values, wherein each of the plurality of ratio values corresponds to one of the points in time. At least one of a position and a direction of movement of the object relative to the first and second reference points is determined based on the identified plurality of ratio values.

25 Claims, 12 Drawing Sheets

APPARATUS AND METHOD FOR IMPLEMENTING A TOUCHLESS SLIDER

CROSS-REFERENCE TO RELATED APPLICATIONS

This application claims the benefit of pending U.S. Provisional Application Ser. No. 61/219,614, filed Jun. 23, 2009 and entitled IMPLEMENTING AN INFRARED SLIDER and this application is a Continuation-In-Part of pending U.S. patent application Ser. No. 12/334,296, filed Dec. 12, 2008 and entitled APPARATUS AND METHOD FOR OPTICAL GESTURE RECOGNITION, both of which are incorporated herein by reference in their entirety.

TECHNICAL FIELD

This invention pertains to touchless sliders and, more particularly, touchless sliders in an optical system.

BACKGROUND

Conventional systems exist that perform gesture recognition, i.e. interpreting user motion as input to a system. For example, touch screen based systems collect user inputs using a touch screen that monitors changes in capacitance and/or resistance on the touch screen to identify the position of user input from a stylus or finger in contact with the touch screen. Changes in the capacitance and/or resistance are interpreted to determine the user's motion. By way of another example, some optical systems capture optical input on a pixel array basis and identify motion by analyzing changes in the pixel data.

SUMMARY

In one embodiment, a method for gesture recognition in an optical system using a touchless slider having first and second reference points positioned along an axis is provided. The method comprises obtaining a plurality of first reflectance values by measuring an amplitude of light reflected from an object relative to the first reference point, wherein each first reflectance value corresponds to a different point in time; obtaining a plurality of second reflectance values by measuring an amplitude of light reflected from the object relative to the second reference point, wherein each second reflectance value corresponds to a different point in time; comparing the plurality of first and second reflectance values to identify a plurality of ratio values between the first reflectance values and the second reflectance values, wherein each of the plurality of ratio values corresponds to one of the points in time; and determining at least one of a position and a direction of movement of the object relative to the first and second reference points based on the identified plurality of ratio values.

In another embodiment, a method for gesture recognition in an optical system using a touchless slider having first and second reference points positioned on an axis is provided. The method comprises identifying movement of an object relative to the first reference point along the axis, wherein the movement is identified based on a plurality of first amplitude values each representing a distance of the object relative to the first reference point at a given point in time; identifying movement of the object relative to the second reference point along the axis, wherein the movement is identified based on a plurality of second amplitude values each representing a distance of the object relative to the second reference point at a given point in time; comparing the plurality of first and second amplitude values at matching points in time to identify movement of the object in a first direction substantially parallel to the axis; and detecting a simultaneous peak in the plurality of first and second amplitude values to identify movement of the object in a second direction substantially perpendicular to the axis.

In still another embodiment, a touchless slider is provided. The touchless slider comprises first and second reference points positioned along an axis; means for obtaining a plurality of first reflectance values by measuring an amplitude of light reflected from an object relative to the first reference point, wherein each first reflectance value corresponds to a different point in time; means for obtaining a plurality of second reflectance values by measuring an amplitude of light reflected from the object relative to the second reference point, wherein each second reflectance value corresponds to a different point in time; means for comparing the plurality of first and second reflectance values to identify a plurality of ratio values between the first reflectance values and the second reflectance values, wherein each of the plurality of ratio values corresponds to one of the points in time; and means for determining at least one of a position and a direction of movement of the object relative to the first and second reference points based on the identified plurality of ratio values.

In yet another embodiment, a method for gesture recognition in an optical system using a touchless slider having first, second, and third reference points positioned around a fixed location is provided. The method comprises obtaining a plurality of first reflectance values by measuring an amplitude of light reflected from an object relative to the first reference point while the object is a variable distance that is greater than zero from the first reference point, wherein each first reflectance value corresponds to a different point in time; obtaining a plurality of second reflectance values by measuring an amplitude of light reflected from the object relative to the second reference point while the object is a variable distance that is greater than zero from the second reference point, wherein each second reflectance value corresponds to a different point in time; obtaining a plurality of third reflectance values by measuring an amplitude of light reflected from the object relative to the third reference point while the object is a variable distance that is greater than zero from the third reference point, wherein each third reflectance value corresponds to a different point in time; comparing the plurality of first, second, and third reflectance values to identify a plurality of ratio values between the first, second, and third reflectance values, wherein each of the plurality of ratio values corresponds to one of the points in time; and determining at least one of a position and a direction of movement of the object relative to the first, second, and third reference points based on the identified plurality of ratio values.

BRIEF DESCRIPTION OF THE DRAWINGS

Certain exemplary embodiments of the present invention are discussed below with reference to the following figures, wherein.

DETAILED DESCRIPTION

Figure 1:
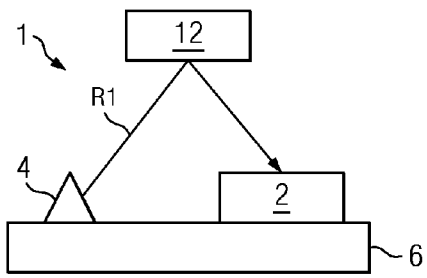
FIG. 1 is a sideview diagram of an embodiment of an optical gesture recognition system in accordance with the present invention based on a single light emitting diode and a single optical receiver.

Described below are several exemplary embodiments of systems and methods for optical gesture recognition based on approximate position determinations using relatively simple optical receivers, such as proximity sensors or infrared data transceivers, to perform reflectance measurements. In general terms, gesture recognition is based on repeatedly measuring reflectance from an object to determine approximate position for the object, comparing the measured reflectances to identify changes in the approximate position of the object over time, and interpreting the change in approximate position of the object as motion correlating to a particular gesture, which may be interpreted as a user movement or as a motion vector of the object.

The positions are generally rough approximations because the reflectance measurements are highly dependent upon the reflectance of the object surface as well as orientation of object surface. Use of the reflectance measurement values from simple optical systems to obtain an absolute measure of distance is typically not highly accurate. Even a system that is calibrated to a particular object will encounter changes in ambient light and objection orientation, e.g. where the object has facets or other characteristics that affect reflectance independent of distance, that degrade the accuracy of a distance measurement based on measured reflectance.

Because of the variations in reflectance, distance measurements are not reliable, but relative motion and relative position can be usefully measured. The present systems and methods for gesture recognition, therefore, rely on relative changes in position. Though the measure of relative motion assumes that the variations in the reflectance of the object are due to motion and not the other factors, such as orientation. Using a single reflectance measurement repeated over time, e.g. a system based on a single LED and receiver, motion of an object toward or away from the system can be identified on a Z axis. This may be useful for a simple implementation, such as a light switch or door opener, or, in machine vision and control applications, the approach of the end of a robot arm to an object, for example. Using two reflectance measurements, e.g. two LEDs and a receiver or two receivers and an LED, reasonable accuracy for position along an X axis may be obtained along with some relative sense of motion in the Z axis. This may be useful for a relatively simple touchless mobile phone interface or slider light dimmer or, in machine vision and control applications, movement of an object along a conveyor belt, for example. Using three or more reflectance measurements, e.g. three LEDs and a receiver or three receivers and an LED, the system can obtain reasonable accuracy for position along X and Y axes, and relative motion in the Z axis. This may be useful for more complex applications, such as a touchless interface for a personal digital assistant device or vision based control of automated equipment. A high number of reflectance measurements can be realized by using multiple receivers and/or LEDs to increase resolution for improved gesture recognition.

In one preferred embodiment, for reflectance measurements, a light source, such as an LED, is activated and the resulting photodiode current is measured. In a multiple LED implementation, each LED is selectively activated and the receiver measures the resulting photodiode current for each LED when activated. The photodiode current is converted to a digital value and stored by a controller, such as a microprocessor processor. The measurements are repeated under the control of the processor at time intervals, fixed or variable. The measurements at each time are compared to obtain an approximate determination of position in the X and Y axes. The measurements between time intervals are compared by the processor to determine relative motion, i.e. vector motion, of the object.

The relative motion of the object can be interpreted as gestures, as can a lack of motion, a pause in motion, or a combination thereof. For example, positive motion primarily in the X axis can be interpreted as right scroll and negative motion as a left scroll. Positive motion in the Y axis is a down scroll and negative motion is an up scroll. Positive motion in the Z axis can be interpreted as a selection or click (or a sequence of two positive motions as a double click. Relative X and Y axis motion can be used to move a cursor. The gesture may also be a motion vector for the object or for the receiver system mounted on a piece of equipment, e.g. a robot arm. For example, in automated equipment applications, motion of an object along an axis may be tracked to detect an object moving along a conveyor belt. By way of another example, the motion vector may be tracked to confirm proper motion of a robot arm or computer numerically controlled (CNC) machinery components with respect to workpiece objects or to detect unexpected objects in the path of the machinery, e.g. worker's limbs or a build up of waste material.

A multiple LED and single receiver with photodiode approach may be a preferred implementation for applications with an optical receiver that is already provided in a device, such as an infrared transceiver or reflectance proximity sensor in a mobile phone or PDA. An alternative approach is to use a single LED and multiple receivers with photodiodes, which may be preferred for applications that are dedicated to gesture recognition or implementations involving high speed gesture recognition. Still another alternative is the use of a network of multiple LED-receiver pairs.

Figure 10:
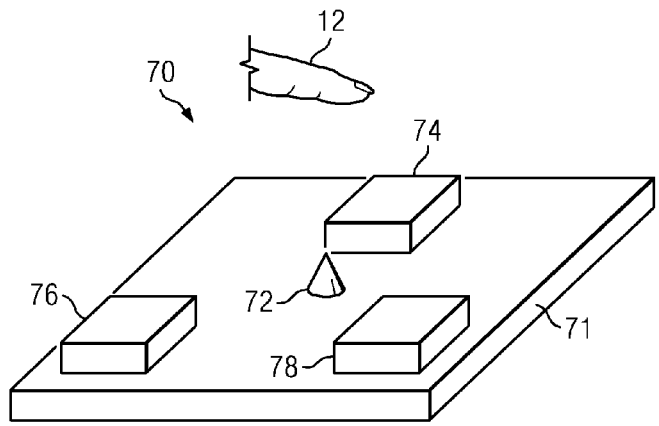
FIG. 10 is a perspective diagram of an embodiment of an optical gesture recognition system in accordance with the present invention based on one light emitting diode and three optical receivers.
Figure 11:
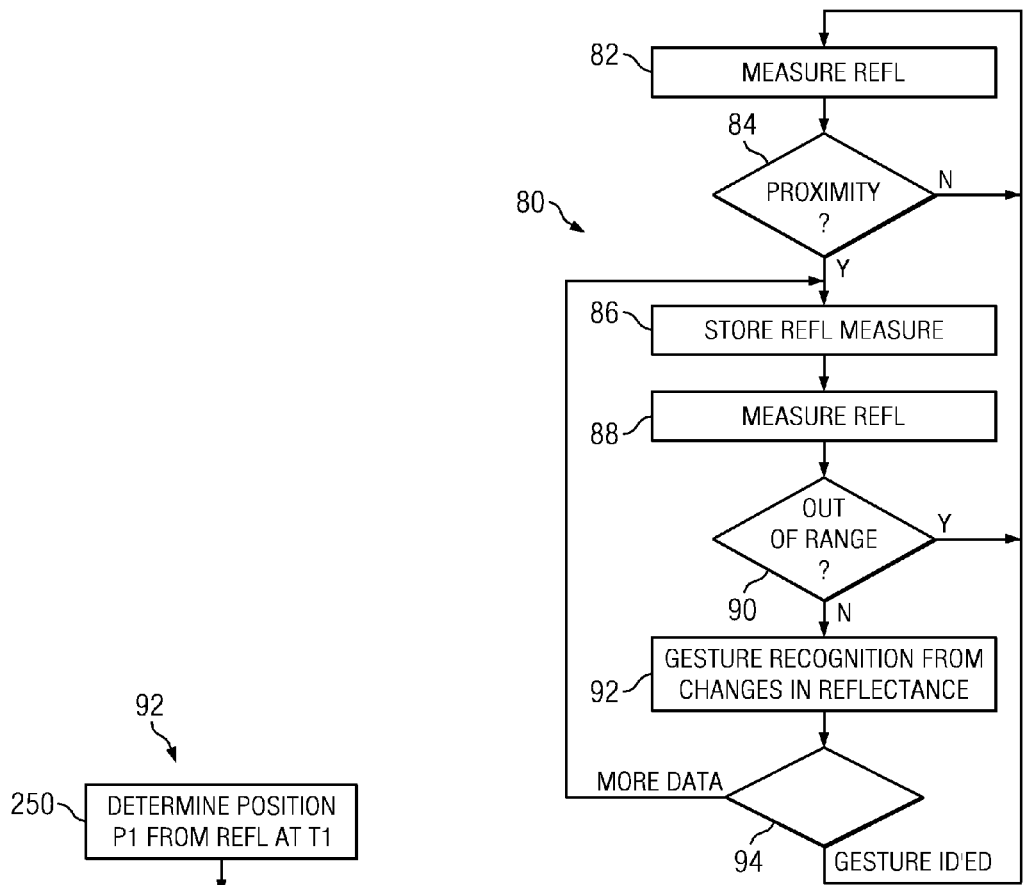
FIG. 11 is a control flow diagram illustrating one example of a process for gesture recognition suitable for use with the optical systems shown in FIGS. 1-8.

FIG. 1 is a sideview diagram of an embodiment of an optical gesture recognition system 1 in accordance with the present invention based on a single light emitting diode (LED) 4 and an optical receiver 2. The optical system may be based on infrared wavelengths and/or visible wavelengths. In this embodiment, receiver 2 and LED 4 are mounted on a common base 6, such as a circuit board. LED 4 is activated and a photodiode in receiver 2 detects reflected light R1, if any, from a target object 12. The strength of the reflected light signal R1 is measured by optical receiver 2. It is assumed that the strength of the reflected light signal roughly represents the distance of object 12 from the optical gesture recognition system 1. FIGS. 10 and 11 discussed below show examples of optical circuits that may be adapted for use as the receiver 2 and LED 4 combination shown in FIG. 1.

Figure 9:
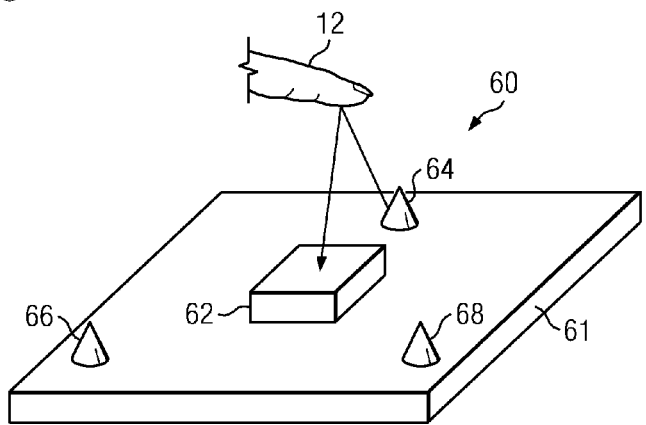
FIG. 9 is a perspective diagram of an embodiment of an optical gesture recognition system in accordance with the present invention based on three light emitting diodes and an optical receiver.

By taking multiple measurements of the strength of the reflected light signal R1 and comparing these measurements over time, receiver 2 can detect whether object 12 is moving towards or away from the optical gesture recognition system 1. For example, if reflectance measurements made later in time are higher, then a controller, such as a microprocessor or microcontroller in receiver 2, concludes that object 12 is moving towards the system 1. If the system 1 is employed in a light switch application, for example, the controller may interpret this gesture to activate a light. If reflectance measurements made later in time are lower, then the controller concludes that object 12 is moving away from the system 1 and may interpret this gesture to deactivate a light. FIG. 9 illustrates a process suitable for use in the microprocessor 108 of FIG. 10 to implement the optical gesture recognition system 1 of FIG. 1.

Figure 2:
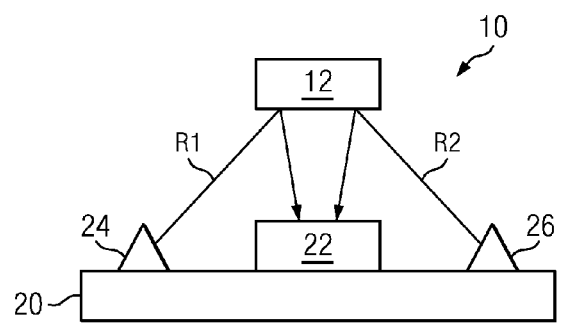
FIG. 2 is a sideview diagram of an embodiment of an optical gesture recognition system in accordance with the present invention based on two light emitting diodes and an optical receiver.

FIG. 2 is a sideview diagram of an embodiment of an optical gesture recognition system 10 in accordance with the present invention based on an optical receiver 22 and two light emitting diodes 24, 26. In this embodiment, receiver 22 and LEDs 24, 26 are mounted along an axis, e.g. an X axis, on a common base 20, such as a circuit board. LEDs 24 and 26 are independently activated and a photodiode in receiver 22 detects reflected light R1 and R2, respectively, from a target object 12. The strength of the reflected light signals R1 and R2 are measured by optical receiver 22. It is assumed that the strength of the reflected light signal roughly represents the distance of object 12 from the optical gesture recognition system 10. FIGS. 10 and 11 discussed below show examples of optical circuits that may be adapted for use as the receiver 22 and LEDs 24, 26 combination shown in FIG. 2.

Figure 3:
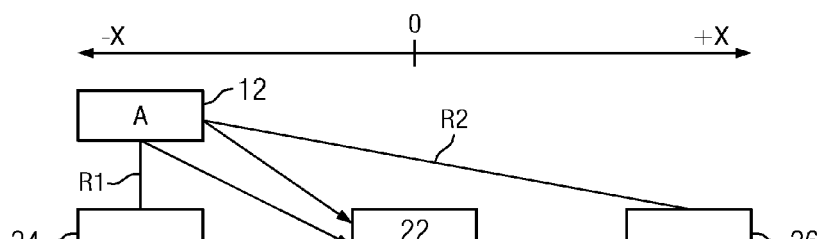
FIGS. 3-5 are sideview diagrams illustrating a series of reflectance measurements performed using the optical system of FIG. 2 involving an object in a series of different positions relative to the optical system.
Figure 4:
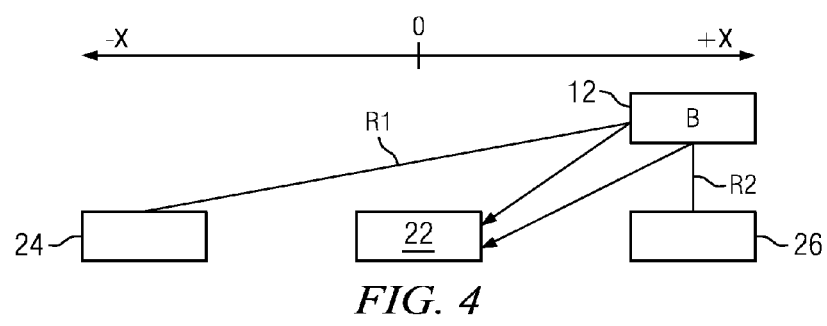
Figure 5:
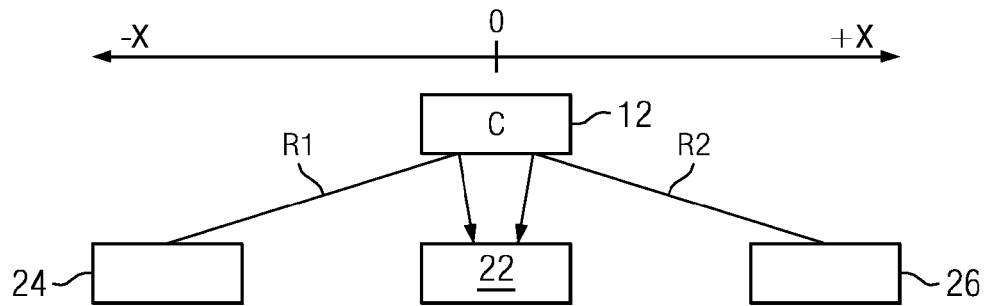

The optical gesture recognition system 10 of FIG. 2 is configured to determine a position of object 12 along an X axis defined by the receiver 22 and LEDs 24, 26. The position of object 12 is made on the basis of the relative strength of the reflected light R1 and R2 measure from each of the LEDs 24 and 26. FIGS. 3-5 are sideview diagrams illustrating a series of reflectance measurements for R1 and R2 performed using the optical system of FIG. 2 involving object 12 in a series of different positions relative to the optical system along an X axis.

In the example of FIG. 3, object 12 is located near LED 24 and, consequently, the reflected light R1 from LED 24 measured by receiver 22 is much greater in amplitude than the reflected light R2 from LED 26. Based on the relative amplitudes measured for R1 and R2, the controller in receiver 22 determines that object 12 is located at −X along the X axis. In the example of FIG. 4, object 12 is located near LED 26 and, consequently, the reflected light R2 from LED 26 measured by receiver 22 is much greater in amplitude than the reflected light R1 from LED 24. Based on the relative amplitudes measured for R1 and R2, the controller in receiver 22 determines that object 12 is located at +X along the X axis. In FIG. 5, object 12 is located near receiver 22 and, consequently, the reflected light R1 from LED 24 measured by receiver 22 is substantially the same as the reflected light R2 from LED 26. Based on the roughly equivalent amplitudes measured for R1 and R2, the controller in receiver 22 determines that object 12 is located at 0 along the X axis.

Using FIGS. 3-5, if receiver 22 records a series of position measurements of −X, 0, and +X sequentially in time for object 12, then the controller in receiver 22 may recognize the left to right motion of object 12 as a gesture. For example, in an application involving a mobile phone or PDA device, this gesture may be recognized as a scroll right command for controlling the data shown on a display for the device. Similarly, a right to left motion, e.g. a sequence of position determinations of +X, 0, and −X, may be recognized as a scroll left command. The magnitude of the scroll may be correlated to the magnitude of the change in position. For example, a gesture defined by a sequence of position measurements by receiver 22 of +X/2, 0, and −X/2, may be interpreted as a left scroll of half the magnitude as the gesture defined by the sequence +X, 0, and −X. The rate of movement may also be approximated. For example, a higher rate of movement may correspond to a fast scroll while a lower rate of movement may correspond to a slow scroll. The gesture may also be interpreted as the motion of an object with respect to a piece of automated machinery, e.g. a workpiece or tool moving in a CNC machine. Note also that while the object is described as being in motion, the approach may also be applied in like manner to movement of the receiver with respect to an object. These values are given as examples and one of ordinary skill in the art will recognize that sophisticated probabilistic or non-linear algorithms for interpreting the gesture from the position measurements may be applied to this example without departing from the scope of the invention.

Also note that the distance of object 12 from receiver 22 may also be determined on a relative basis. For example, if the ratio of R1 to R2 remains substantially the same over a sequence of measurements, but the absolute values measured for R1 and R2 increase or decrease, this may represent motion of object 12 towards receiver 22 or away from receiver 22, respectively. This motion of object 12 may, for example, be interpreted as a gesture selecting or activating a graphical object on a display, e.g., clicking or double clicking. In other embodiments, a pause in motion may be interpreted as a selection. Motion (e.g., scrolling left to right or vice versa), either alone or in combination with pauses or "clicking" gestures, may be used to provide a touchless slider, as will be described later in greater detail. Alternatively, the motion of object 12 may be interpreted as the movement of a workpiece or tool into position for further processing in automated equipment, for example.

Figure 6:
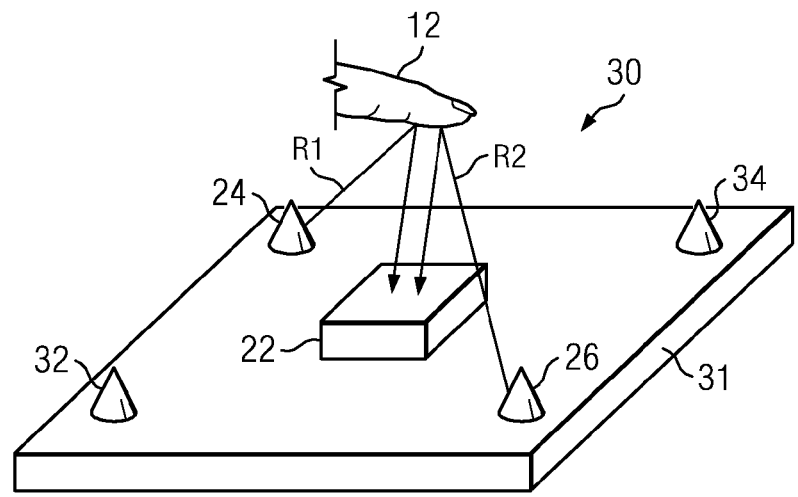
FIG. 6 is a perspective diagram of an embodiment of an optical gesture recognition system in accordance with the present invention based on four light emitting diodes and an optical receiver.

The principles for two dimensional object position determination and gesture recognition described above with respect to FIGS. 1-5 may be extended to three dimensional applications. FIG. 6 is a perspective diagram of an embodiment of an optical gesture recognition system 30 in accordance with the present invention based on optical receiver 22 and four light emitting diodes 25, 26, 32, 34. In this embodiment, receiver 22 and LEDs 24 and 26 are arranged along an X axis, as described above. A Y axis is defined by the alignment of receiver 22 and LEDs 32 and 34. Receiver 22 and LEDs 24, 26, 32, 34 are mounted on a common base 31. The relative position of object 12 along the Y axis may be determined using receiver 22 and LEDs 32 and 34 in a manner similar to that described above with regard to the X axis and LEDs 24 and 26. LEDs 32 and 34 are activated independently of one another and of LEDs 24 and 26 and receiver 22 measures the resulting reflection from object 12. By determining the position of object 12, e.g. a user's finger or a workpiece, in both the X and Y axes, more complex motion and gestures can be tracked and recognized using receiver 22. Motions involving changes in distance from receiver 22 can also be identified by monitoring changes in amplitude of the measurements from LEDs 24, 26, 32, 34 when the relative ratios of the measured reflections remain substantially the same. To measure distance from receiver, all LEDs can be activated simultaneously and resulting measured reflectance will be proportional to a sum of all the individual reflectance contributions. This simple method may be used to detect if the object is in the range to initiate gesture recognition algorithm. Although not shown, it is understood that one or more of the LEDs 24, 26, 32, 34 may be positioned along a Z axis, rather than along the two dimensional plane defined by the X and Y axes.

Figure 7:
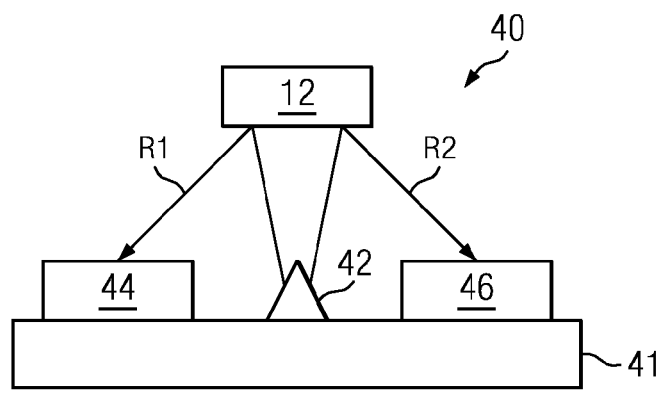
FIG. 7 is a sideview diagram of an embodiment of an optical gesture recognition system in accordance with the present invention based on one light emitting diode and two optical receivers.

The present invention may be implemented using multiple optical receiver devices and a single LED. FIG. 7 is a sideview diagram of an embodiment of an optical gesture recognition system 40 in accordance with the present invention based on one light emitting diode 42 and two optical receivers 44 and 46 mounted on a common base 41. In this embodiment, LED 42 is activated and optical receivers 44 and 46 independently measure the reflection R1 and R2, respectively, from object 12. Relative position, distance and movement may be determined in a manner similar to that described above with respect to FIGS. 2-5. The ratios of R1 and R2 may be utilized to approximately determine the position of object 12 along an X axis on which are arranged LED 42 and optical receiver 44 and 46. A stronger measured reflectance for R1 than for R2 generally indicates proximity of object 12 to receiver 44. Likewise, a stronger measured reflectance for R2 than for R1 generally indicates proximity of object 12 to receiver 46. Substantially equivalent measured reflectances R1 and R2 generally indicates proximity of object 12 to LED 42. Substantially constant ratios of R1 and R2 with increasing or decreasing magnitudes for R1 and R2 generally indicates object 12 having moved closer or farther from LED 42.

Figure 8:
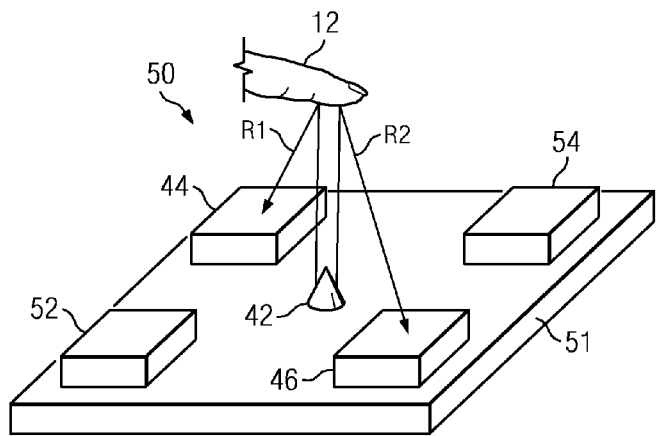
FIG. 8 is a perspective diagram of an embodiment of an optical gesture recognition system in accordance with the present invention based on one light emitting diode and four optical receivers.

The principles for two dimensional object position determination and gesture recognition described above with respect to FIG. 7 may be extended to three dimensional applications. FIG. 8 is a perspective diagram of an embodiment of an optical gesture recognition system 50 in accordance with the present invention based on one light emitting diode 42 and four optical receivers 44, 46, 52, 54. Similarly to the arrangement of FIG. 6, LED 42 and receivers 44 and 46 are arranged along an X axis while LED 42 and receiver 52 and 54 are arranged along a Y axis. Position of object 12 with respect to the X and Y axes of optical gesture recognition system 50 is obtained by measuring reflectance of light from LED 42 to each of the receivers 44, 46, 52, 54 in a manner similar to that described with respect to the arrangement of FIG. 6.

In the embodiments of FIGS. 7 and 8, LED 42 may be activated and each of the optical receivers may simultaneously measure reflectance. The reflectance measurements are transferred to a processor for calculation of position and gesture recognition. This may be accomplished in a variety of ways. For example, the optical receivers may be interfaced with a processor that performs gesture recognition. In another example, the optical receivers are networked and a processor within one of the receivers is utilized to perform gesture recognition. Reflectance measurement can be realized also by networked receiver-LED pairs forming a synchronous array of proximity sensors.

The number of elements used for reflectance measurement and gesture recognition may be varied as desired for a given application. For example, power considerations may result in the selection of a minimum number of elements needed to satisfy the particular needs of a given application. The manner for determining the relative position of an object and the algorithm employed for gesture recognition need merely be adapted for the number and position of the elements. For example, FIG. 9 is a perspective diagram of an embodiment of an optical gesture recognition system 60 in accordance with the present invention based on one optical receiver 62 and three light emitting diodes 64, 66, 68. Similarly, FIG. 10 is a perspective diagram of an embodiment of an optical gesture recognition system 70 in accordance with the present invention based on one light emitting diode 72 and three optical receivers 74, 76, 78. Each of the embodiments of FIGS. 9 and 10 can measure an approximate position of object 12 and detect three dimensional movement of object 12, which may be interpreted as a gesture. The calculations for position based on reflectance and gesture recognition are merely adapted for the position of LEDs 65, 66, 68 relative to receiver 62 in the embodiment of FIG. 9 and, similarly, adapted for the position of receiver 74, 76, 78 relative to LED 72 in the embodiment of FIG. 10.

FIG. 11 is a control flow diagram illustrating one example of a process 80 for gesture recognition suitable for use with the optical systems shown in FIGS. 1-10. The process involves measuring reflectance at step 82 using one or more LEDs depending on the optical system. In the multiple LED embodiments, reflectance is measured by selectively activating each LED and measuring the reflectance detected by the optical receiver for each LED. For example, in the embodiment of FIG. 9, LEDs 64, 66 and 68 are independently activated by a controller, such as a controller in receiver 62, and the reflectance detected by receiver 62 is measured for each LED. In the embodiment of FIG. 10, LED 72 is activated and each of receivers 74, 76, and 78 measure the reflected light, which, for example, is collected in a controller, such as one of the controllers in receiver 74, 76, 78 or in a separate controller device, so that further processing can take place.

If the measured reflectance REFL indicates that no object is in close enough proximity to the optical system to reflect light, e.g. the measured reflectance is below a selected threshold value, then control branches at step 84 back to step 82 in order to measure the reflectance again. If the measure reflectance REFL indicates an object in proximity, e.g. the measured reflectance meets or exceeds the selected threshold, then control branches to step 86. A variety of approaches may be employed for determining proximity. For example, in the optical receiver embodiments that utilize either multiple LEDs or multiple receivers, the designer may choose to detect proximity when any of the LEDs or receivers exceeds the selected threshold. Alternatively, the decision on proximity may be positive when more than one of the LEDs, in the multiple LED embodiments, or more than one receiver, in the multiple receiver embodiments, measures reflectance that meets the selected threshold. Proximity condition can be also obtained by simultaneously activating all LEDs and measuring resulting total reflectance, which is the sum of all individual reflectance contributions.

In order to detect movement, the reflectance is measured at multiple points in time and the measurements at different times compared to determine the relative motion of the object 12. At step 86, the reflectance measurements REFL are stored for later comparison. At step 88, the next set of reflectance measurements are made. Note that different implementations may require more than two measurements and the process may be modified to perform as many measurements as required for gesture recognition for the particular implementation. If the reflectance measurements at step 88 indicate that the object 12 has moved out of range, e.g. measure reflectance is below the selected threshold, then control branches at step 90 back to step 82, where the process waits to detect object 12 back in proximity. Otherwise, control branches to step 92 for gesture recognition.

Gesture recognition based on the measured reflectance is performed at step 92. For example, an approximate position of detected object, e.g. object 12, may be determined based on the reflectance measurements at a given point in time, e.g. T1. The change in position from one point in time to the next, e.g. T2, or over several points in time, depending upon the implementation, is then analyzed to determine whether the change or lack of change in position represents a gesture and, in some embodiments, the nature of the gesture. In one approach, a look-up table may be utilized to interpret the change in position into an identified gesture. Alternatively, the interpretation algorithm may correlate the change in position to a symbol table and the gesture determined based on the mathematical distance from the measured position change to a symbol pertaining to a gesture in the symbol table. Symbol recognition utilized for conventional stylus input devices, such as stylus input personal digital assistant (PDA), may be adapted for use in the present invention. See FIG. 14. The gesture may also be interpreted as a motion vector for use in a machine control algorithm or machine vision application, for example. One of ordinary skill in the art will recognize that a variety of approaches for gesture recognition may be employed without departing from the teaching of the present invention and that the examples described should not be interpreted as limiting the scope of the invention.

In embodiments where multiple reflectance measurements are needed or where the change in position is ambiguous with regard to the gesture recognition at step 92, control branches at step 94 back to step 86 for another set of reflectance measurements. If the gesture is identified and no further reflectance data is needed then control branches at step 94 back to step 82 to begin the process again.

Figure 12:
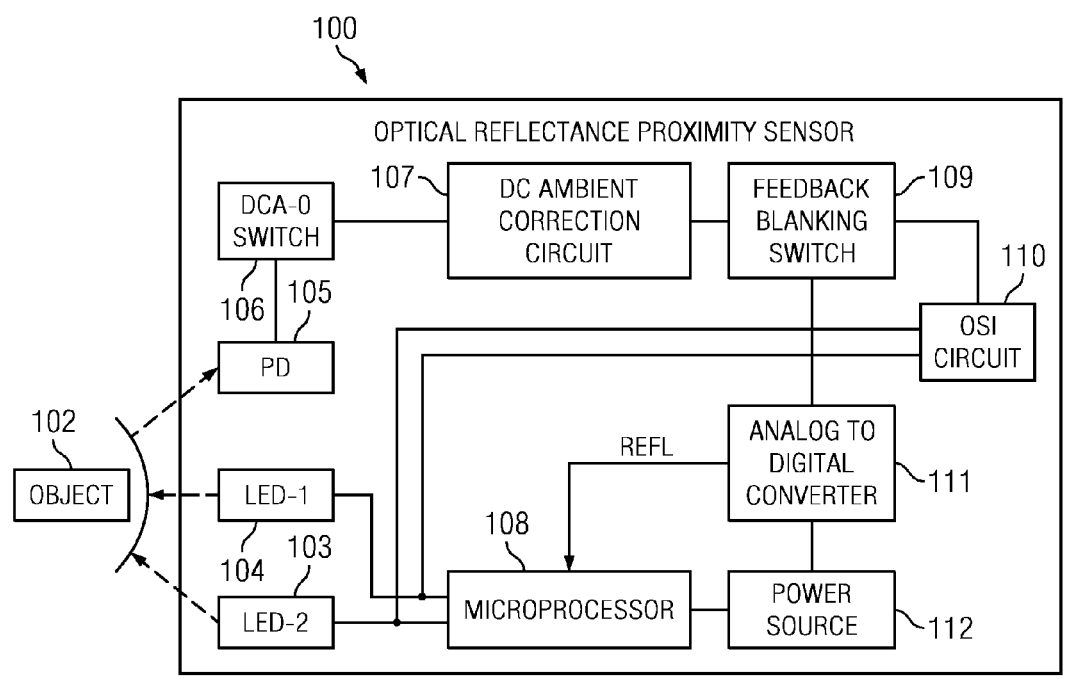
FIG. 12 is a functional block diagram of one example of an optical gesture recognition system suitable for use in accordance with the present invention based on two light emitting diodes and an optical receiver.

FIG. 12 is a functional block diagram of one example of an optical gesture recognition system 100 suitable for use in accordance with the present invention based on two light emitting diodes and an optical receiver. Optical systems that are suitable for use in the present invention generally provide a measure of reflectance that indicates an amplitude of the received optical signal. Proximity sensor 100 is configured as an "active" optical reflectance proximity sensor (ORPS) device that can sense proximity by measuring a reflectance signal received at a photodiode (PD) 105 from an object 102 residing in or moving through the detection corridor or calibrated detection space of the module. Very basically, sensor 100 works by emitting light through one or more light emitting diodes (LEDs) like LED-1 (104) and LED-2 (103) implemented in this example. The light emitted from LEDs 103 and 104, in this example, is directed generally toward an area where object 102 may cause detection by its introduction into and/or movement through the object detection corridor or "visible" area of the sensor. Reflected light from object 102 and ambient light from background or other noise sources is received at PD 105 provided as part of the sensor and adapted for the purpose. Sensor 100 is enhanced with circuitry to reliably determine the amount of reflectance received from object 102 over noise and other ambient signals to a high degree of sensitivity and reliability.

There may be one or more LEDs such as LEDs 103 and 104 installed in proximity sensor 100 without departing from the spirit and scope of the present invention. The inventors show two LEDs and deem the illustration sufficient for the purpose of explaining the invention. In one embodiment there may be more than two LEDs chained in parallel, multiplexed, or independently wired. LEDs 103 and 104 in this example may be very small compact devices capable of emitting continuous light (always on) or they may be configured to emit light under modulation control. Likewise, they may be powered off during a sleep mode between proximity measurement cycles. The actual light emitted from the LEDs may be visible or not visible to the human eye such as red light and/or infrared light. In one embodiment, at least one visible-light LED may be provided for optical reflectance measuring.

In this logical block diagram, the exact placement of components and the trace connections between components of sensor 100 are meant to be logical only and do not reflect any specific designed trace configuration. FIGS. 1-10 show embodiments illustrating examples of possible placement of LEDs and optical receivers, though these examples are not exhaustive and do not limit the scope of the invention. In a preferred embodiment, LEDs 103 and 104 are strategically located in proximity to PD 105 so that light (illustrated by broken directional arrows) reflects off of object 102 and is efficiently received by PD 105 as reflectance.

ORPS 100 includes a DC ambient correction circuit 107, which may be referred to hereinafter as DCACC 107. DCACC 107 is a first order, wide loop correction circuit that has connection to a DC ambient zero (DCA-0) switch 106 that is connected inline to PD 105 through a gate such as a PMOS gate described later in this specification. Sensor 100 may therefore be first calibrated where the DC ambient light coming from any sources other than optical reflectance is measured and then cancelled to determine the presence of any reflectance signal that may qualified against a pre-set threshold value that may, in one example, be determined during calibration of sensor 100.

Reflectance is determined, in a preferred embodiment of the present invention by measuring the amplified pulse width of an output voltage signal. Correction for DC ambient light is accomplished by enhancing sensor 100 with the capability of producing an amplified pulse width that is proportional to the measured DC ambient light entering PD 105. DCACC 107 and switch 106 are provided and adapted for that purpose along with a voltage output comparator circuit 111. More particularly during calibration for DC ambient light, correction is accomplished by setting the DC-ambient correction to zero using switch 106 at the beginning of the calibration cycle and then measuring the width of the detected pulse during the calibration cycle. The width of the output pulse is proportional to the background DC ambient. Of course, during calibration the transmitter LED or LEDs are disabled.

ORPS 100 includes a power source 112 and a microprocessor 108. In this example, microprocessor 108 is logically illustrated as onboard sensor 100. This is not required in order to practice the present invention. Microprocessor 108 may be part of an interfacing piece of equipment or another optical receiver depending on the application. Power source 112 may be a battery power source, a re-chargeable source or some other current source. In this example, the transmitter LEDs 103 and 104 are connected to and are controlled by microprocessor 108 and may receive power through microprocessor 108 as well. PD 105 also has a connection to power source 112. In one embodiment there may be more than one power source used to operate sensor 100 without departing from the spirit and scope of the present invention. Power source 112 and microprocessor 108 are illustrated logically in this example only to show that the sensor derives power from a power source and that optionally, micro processing may be used to control certain sensor functions.

DC ambient circuit 107 produces a voltage from its input signal received from photodiode 105. ORPS 100 includes an analog to digital converter circuit (ADC) 111 that, in this example, converts an input voltage signal produced by photodiode 105 to a digital reflectance measurement value REFL that is output to microprocessor 108. In this example, microprocessor 108 is configured to make the proximity decision at step 84 of process 80 shown in FIG. 11 based on the measured reflectance value compared against a threshold value to determine proximity. Input to ADC 111 from circuit 107 is routed through a feedback-blanking switch (FBS) 109 provided inline between DCACC 107 and ADC 111. In this embodiment, FBS 109 is driven by a one-shot circuit (OSI) 110, which provides the blanking pulse to the switch when LEDs 103 and 104 are enabled and transmitting by microprocessor 108. FBS 109 and OSI 110 in combination provide an additional sensitivity enhancement by reducing noise in the circuit.

In the operation of ORPS 100, calibration is first performed to measure the average DC ambient light conditions using DCACC 107 and ADC 111 with LED 103 and LED 104 switched off. When the DC ambient loop has settled and a valid threshold has been determined, LEDs 103 and 104 are independently switched on by microprocessor 108 for reflectance measurement using the TX Control and TX 2 Control signals. Reflectance received at PD 105 from object 102, in this example, produces a voltage above DC ambient. The resulting input voltage from PD 105 reaches ADC 111, which converts the voltage to a digital value REFL that is output to microprocessor 108. Microprocessor 108 activates one LED at a time and measures the resulting reflectance value REFL produced for each LED 103, 104. Microprocessor 108 may then calculate an approximate position for object 102 based on the measured reflectance values and the relative positions of LEDs 104, 105 and photodiode 105 with respect to one another. Microprocessor then interprets a series of approximate positions to a corresponding gesture.

In one embodiment, optical isolation is provided, such as by a partition, to isolate photodiode 105 from receiving any cross talk from LEDs 103 and 104. One or more optical windows may be provided in the casing of sensor 100 to enable the desired light reflectance path from LED to photodiode. ORPS 100 may be provided in high volume as a very low cost and robust reflectance sensor for use in many different consumer applications. For example, ORPS 100 may be configured as a battery-powered on-off sensor where, combined with an RF transmitter, the system sends a first RF message to a remote receiver when an object is detected as approaching ORPS 100. ORPS 100 may be configured to send a second RF message when it detects the object moving away. This may be useful for a wireless automatic doorbell or a wireless security alarm sensor. Other conceivable applications for the low cost low power sensor might include automotive backup indicators, light-switch triggers, toys that sense proximity, computer-monitor activation, and cell-phone user interfaces.

Figure 13:
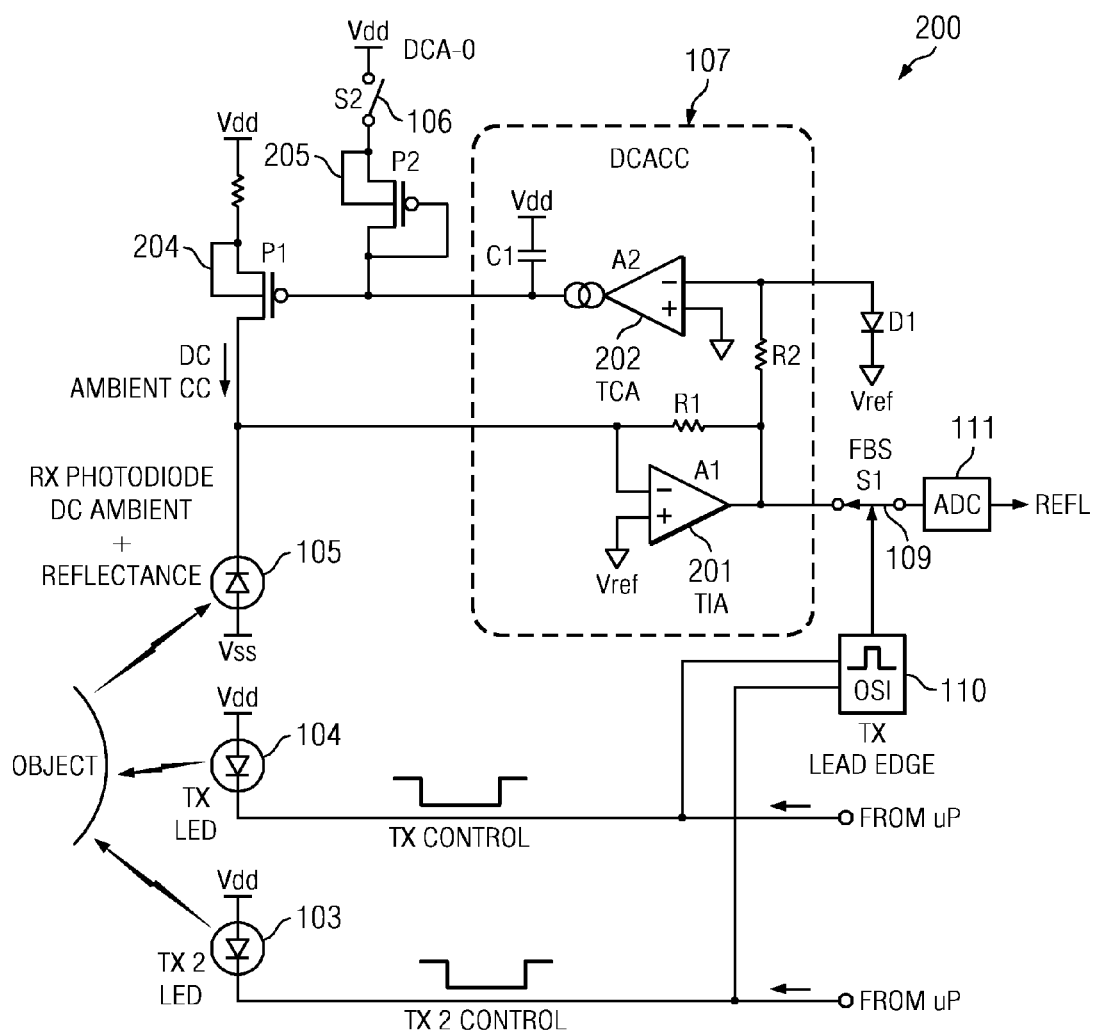
FIG. 13 is a circuit diagram illustrating one example of circuitry for optical reception for a portion of the optical gesture recognition system of FIG. 10.

FIG. 13 is a circuit diagram illustrating one example of circuitry for optical reception 200 for a portion of the sensor 100 of FIG. 12. Circuitry 200 may be implemented in a complimentary metal oxide semiconductor (CMOS) semiconductor process. Other circuitry logic may also be used to implement the appropriate functionality. The microprocessor can be external or built-in on the same chip substrate. Photodiode 105 can be external or also implemented on the same chip. LED1 104 and LED2 103 are external in this example.

Circuitry 200 includes DCACC 107 and ADC 111. The circuitry making up DCACC 107 is illustrated as enclosed by a broken perimeter labeled 107. DCACC 107 includes a transimpedance amplifier (TIA) A1 (201), a transconductance amplifier (TCA) A2 (202), resistors R1 and R2, and a charge capacitor (C1). These components represent a low-cost and efficient implementation of DCACC 107.

DCA-0 switch (S2) 106 is illustrated as connected to a first PMOS gate (P2), which is in turn connected to a PMOS gate (P1). Gate P1 is connected inline with the output terminal of amplifier A2 (202). A2 receives its input from trans impedance amplifier A1 (201). For purposes of simplification in description, amplifier A2 will be referenced as TCA 202 and amplifier A1 will be referenced as TIA 201. TCA 202 removes DC and low frequency signals. It is important to note that for proximity sensing, TCA 202 takes its error input from the amplifier chain, more particularly from TIA 201. In this respect, TIA includes amplifier A1 and resistor R1.

A microprocessor (uP) is not illustrated in FIG. 13, but is assumed to be present as an on board or as an off board component. Transmitting (TX) LED 104 is illustrated in proximity to PD 105 as was illustrated in FIG. 12. TX LED 103 is provided in this embodiment to permit a position along an X axis to be approximated. One of ordinary skill in the art will readily understand implementations using one or more than two TX LEDs. In this example, TX control is provided by a connected microprocessor (uP) as indicated by respective TX control lines.

When measuring reflectance, PD 105 receives reflected light from whichever LED 103, 104 is activated by microprocessor 108, where the reflected light is illustrated as a reflectance arrow emanating from object 102 and entering PD 105. The resulting current proceeds to TIA 201 formed by operational amplifier A1 and feedback resistor R1. Amplified output from TIA 201 proceeds through FBS 109 (S1) as signal VO (voltage out) to ADC 111.

Output from TIA 201 also proceeds through R2 to the input of DCACC 202 (A2). Here, the input is limited by a diode (D1) or an equivalent limiting circuit. In this way, the output of TCA 202 (A2) has a fixed maximum current to charge capacitance C1. This state causes the current proceeding through PMOS 204 (P1) to ramp at a maximum linear rate. At such time when the current through PMOS 201 (P1) equals the current produced by PD 105, the input error of TIA 201 goes to zero. This state causes the output of TIA to fall thereby reducing the error input to TCA 202 (A2). This slows and then prevents further charging of C1. DCACC 107 can only slew at a fixed rate for large signals and at a proportionally smaller rate for signals below the clipping level, the time it takes for DCACC 107 to correct the input signal change is a measure of the amplitude of the input signal change. In one embodiment, the reflectance value REFL output by ADC 111 is proportional to the total change of optical signal coupled into the photodiode generated by the LED. In other embodiments, the value REFL may be logarithmically compressed or inverted, for example, as required for the particular implementation.

This input current conversion to output pulse width includes converting both DC ambient and reflection signals to RO pulse width changes. DCA-0 switch 106 (S2) is closed during calibration and measurement of DC ambient light. Closing switch S2 causes the current through PMOS 204 (P1) to fall near zero while still maintaining voltage on C1 very close to the gate threshold of P1. A period of time is allowed for the DC ambient correction loop to settle. DAC-0 106 (S2) is opened after the correction loop has settled re-enabling the DC-ambient correction loop. The voltage at C1 then increases until the current through PMOS 204 (P1) equals the DC ambient photocurrent resulting from PD 105. Therefore, the time it takes for RO to return to its normal state after changing due to proximity detection is proportional to the DC-ambient input current output by PD 105 with the LEDs switched off.

Conversely, for measuring reflectance, S2 is held open while sufficient time is allowed for DC ambient background calibration including letting the DC ambient loop settle or cancel the average DC background ambient. After calibration is complete, TX LEDs 103 and 104 are enabled to transmit light. The subsequent increase in photocurrent put out by PD 105 as the result of reflectance from object 102 is amplified by A1 causing a change in RO output from VOCC 111 only if the amplified change exceeds the proximity detection threshold. After detecting reflectance (sensing proximity) the DC-ambient loop causes the voltage on C1 to increase until it cancels the increase in photocurrent due to reflectance. At this point in the process, VO (the amplified signal output from TIA 201) returns to its normal value, thus ending the detection cycle and allowing RO (output from VOCC 111 to return to its previous value. The period of time between TX of the LEDs and when RO returns to its previous value is proportional to the magnitude of the reflectance signal.

One of skill in the art will recognize that within the sensor circuitry 200 presented in this example, DCACC 107 continuously operates to remove normal changes in the background ambient light. Only transient changes produce an output. Output only occurs when there is a difference between the DC correction signal and the input signal. An advantage of this method of reflectance measurement is that resolution is limited by the "shot noise" of PD 105, provided a low noise photo amplifier is used. Circuitry 200 exhibits the lowest noise for the DC ambient correction current source if a moderately large PMOS is used for P1 and an appropriate degeneration resistor is used at its Vdd source. The integrator capacitor on the gate of P1 removes most of the noise components of TCA 202.

In this embodiment, feedback blanking is implemented by switch 109 (S1), which is driven by one-shot circuit (OS1) 110. OS1 110 produces a blanking pulse when the TX LED function is enabled, i.e. in response to the TX Control and TX 2 Control signals from the microprocessor. This blanking pulse is wider in this example than the settling time for transients within TIA 201 (A1). As discussed further above, introducing a blanking pulse into the process increases the sensitivity of the receiver. Otherwise the sensitivity of the receiver is reduced due to feedback noise from the leading edge of the transmitted pulse from LEDs 103 and 104.

Figure 14:
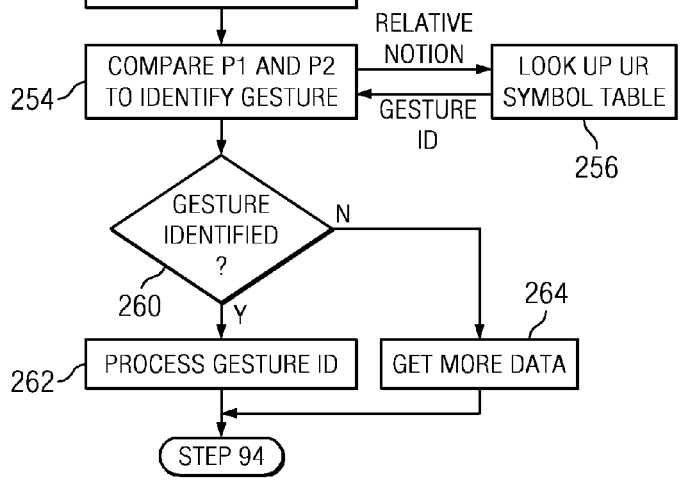
FIG. 14 is a control flow diagram illustrating one example of a process for gesture recognition based on approximating changes in position using reflectance measurements referred to in gesture recognition step in the process of FIG. 11.

FIG. 14 is a control flow diagram illustrating one example of a process 92 for gesture recognition based on approximating changes in position using reflectance measurements referred to in gesture recognition step 92 in the process 80 of FIG. 11. In this example, at step 250, an approximate position P1 for an object is determined from reflectance measurement values REFL obtained at a first point in time, T1, using the optical sensor 100 of FIG. 12. These measurements may have been obtained at step 82 in FIG. 11. At step 252, an approximate position for the object is determined from reflectance measurement values REFL obtained using sensor 100 at a second point in time, T2.

The approximate positions P1 and P2 are then compared at step 254 in order to identify a corresponding gesture. In the example shown in FIG. 14, the relative motion from P1 to P2 is determined and normalized to a value RELATIVE MOTION that is used to index a look-up or symbol table 256 to obtain a GESTURE ID value corresponding to a gesture corresponding to the motion vector from P1 to P2 or a value indicating that no gesture could be identified for the motion. If a valid GESTURE ID value was identified, then control branches at step 260 to step 262, where the GESTURE ID is processed. For example, a message is sent to a process for controlling a user interface to a PDA or a message is sent wirelessly to a remote receiver that activates a light or a security camera. By way of another example, the GESTURE ID may correspond to the motion or position of an object or piece of equipment in automated equipment and a message, e.g. denoting "object in position" or "object out of position", is sent to a process for controlling the equipment. If no gesture could be identified, then control branches to step 264 to get more data for analyzing the gesture. In simple implementations, the system may discard one or more of the earlier reflectance measurements, e.g. discard P1, store P2 as P1, get new data to calculate P2, and use the new data pair to index the table. In more complex implementations, the system may obtain one or more additional reflectance measurements to track the relative motion of the object in order to identify the gesture. Processing returns to step 94 of FIG. 11 for continued reflectance measurement.

Figure 15:
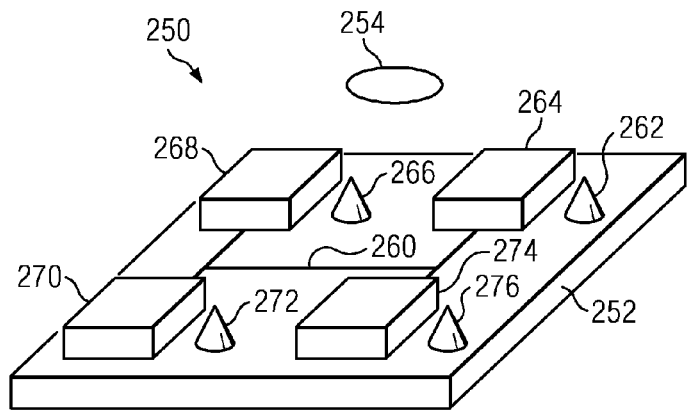
FIG. 15 is a perspective diagram of an embodiment of an optical gesture recognition system in accordance with the present invention based on four networked LED and receiver pairs.

In some applications, it may be simplest to provide for a receiver to operate with a single LED and combine the resulting reflectance measurements from multiple of such receiver-LED pairs. FIG. 15 is a perspective diagram of another embodiment of an optical gesture recognition system 250 in accordance with the present invention based on four networked LED and receiver pairs. In this embodiment, receiver 264 detects light reflected by object 254 from LED 262. Similarly, receiver 268 activates LED 266 and measures the resulting reflectance, receiver 270 activates LED 272 and measure the resulting reflectance, and receiver 274 activates LED 276 and measures the resulting reflectance. In this embodiment, receivers 264, 268, 270 and 274 are networked together via network connection 260 to communicate the measured reflectance values for gesture recognition. It may also be preferable for the receivers to synchronize their activity so that only one LED is activated at a given point in time to avoid interfering with adjacent receiver and LED pairs.

Figure 16:
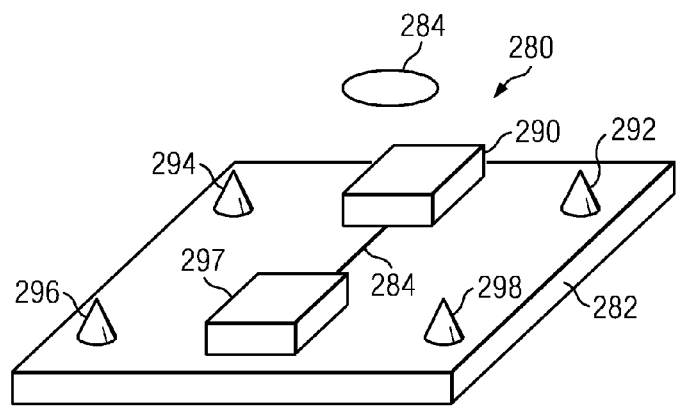
FIG. 16 is a perspective diagram of an embodiment of an optical gesture recognition system in accordance with the present invention based on two sets of one receiver and two light emitting diodes each, where the receivers are networked.

FIG. 16 is a perspective diagram of an embodiment of an optical gesture recognition system 280 in accordance with the present invention based on two sets of one receiver and two light emitting diodes each, where the receivers 290 and 297 are networked via network connection 284. In this example, receiver 290 activates LEDs 292 and 294 and measures the resulting reflectance. Likewise, receiver 297 activates LEDs 296 and 298 and measures the resulting reflectance. The measured reflectance values are communicated via network 284 for gesture recognition. This arrangement is similar to the embodiment of FIGS. 2-5 and may be a preferred implementation in some applications.

The LEDs described above generally have the same electro-optical properties, e.g. spectral response, emission profile and output power, which tends to simplify the signal processing for gesture recognition. However, LEDs with different characteristics may be employed without departing from the scope of the invention. For example, it is possible to achieve simplified triangulation using two light sources with significantly different emission characteristics. An approximate absolute position of the object can be determined by comparing individual reflectances corresponding to each light source. If both light sources, LED1 and LED2 have similar output power, but the light source LED1 has a narrow half-angle while the second light source LED2 has a much wider half-angle, if reflectance R1 corresponding to LED1 is much higher than reflectance R2 corresponding to LED2, then the object is located near above the receiver. If R1 is small and R2 is zero, then the object is far above the receiver. If R2 is small and R1=0, the object is far off-axis from the receiver. Thus a gesture can be associated with location of the object in a specific area in a relative position to a receiver and/or with motion from one specific area to another, forming for example a virtual push-button switch. Visual and/or audible cues may be used to provide additional feedback to a user.

Figure 17:
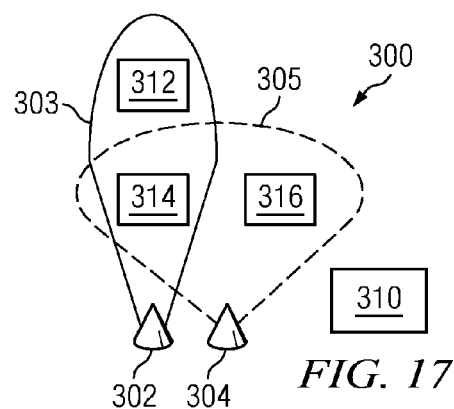
FIG. 17 is a functional block diagram illustrating an optical gesture recognition system in accordance with the present invention based on two light emitting diodes and a receiver, where the diodes have different characteristics for half-angle and optical power.

FIG. 17 is a functional block diagram illustrating an optical gesture recognition system 300 in accordance with the present invention based on two light emitting diodes 302 and 304 and a receiver 310, where the diodes have different characteristics for half-angle and power. In this example, LED 302 has higher power, but a narrower half-angle, which results in an illumination region 303, while LED 304 has lower power and a wider half-angle, which results in an illumination region 305. If receiver 310 detects a high reflectance for LED 302, but low reflectance for LED 304, then the object falls within the portion of illumination region 303 that is outside of illumination region 305 and the position of the object may be approximated in the vicinity shown by object 312. If receiver 310 receives the similar reflectance levels for LEDs 302 and 304, then the object falls within both illumination regions 303 and 305 and the position of the object may be approximated in the vicinity shown by object 314. If receiver 310 receives a high level of reflectance for LED 304, but low reflectance for LED 302, then falls within illumination region 305, but outside of region 303, and the position of the object may be approximated in the vicinity shown by object 316.

Figure 18:
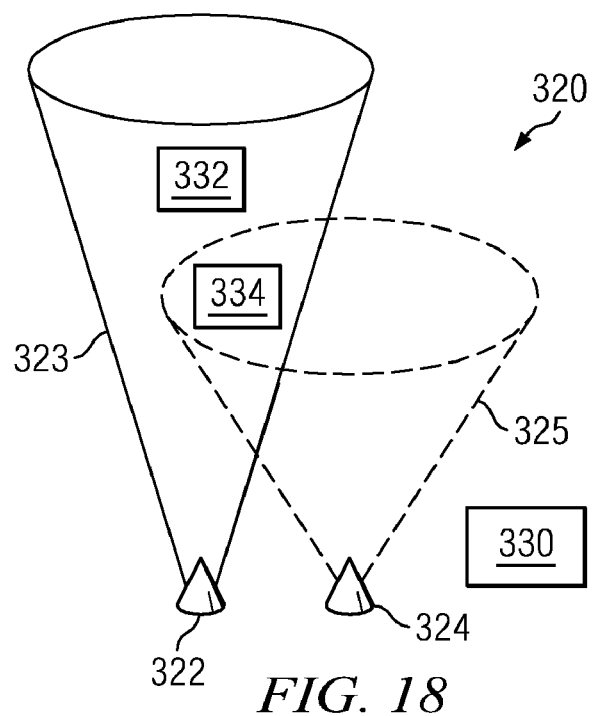
FIG. 18 is a functional block diagram illustrating an optical gesture recognition system in accordance with the present invention based on two light emitting diodes and a receiver, where the diodes have different characteristics for power, but the same half-angle.

FIG. 18 is a functional block diagram illustrating an optical gesture recognition system 320 in accordance with the present invention based on two light emitting diodes 322, 324 and a receiver 330, where the diodes have different characteristics for optical power. In this example, LED 322 has higher optical power, which results in an illumination region 323, while LED 324 has lower optical power, which results in an illumination region 325. If receiver 330 detects a high reflectance for LED 322, but low reflectance for LED 324, then the object falls within the portion of illumination region 323 that is outside of illumination region 325 and the position of the object may be approximated in the vicinity shown by object 332. If receiver 330 receives the similar reflectance levels for LEDs 322 and 324, then the object falls within both illumination regions 323 and 325 and the position of the object may be approximated in the vicinity shown by object 334.

Figure 19:
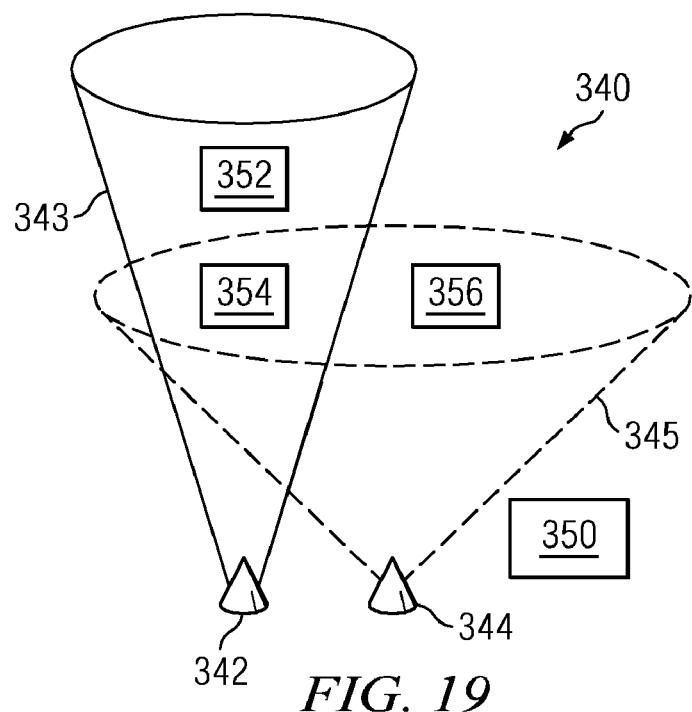
FIG. 19 is a functional block diagram illustrating an optical gesture recognition system in accordance with the present invention based on two light emitting diodes and a receiver, where the diodes have different characteristics for half-angle.

FIG. 19 is a functional block diagram illustrating an optical gesture recognition system 340 in accordance with the present invention based on two light emitting diodes 342, 344 and a receiver 350, where the diodes have different characteristics for half-angle of illumination. In this example, LED 342 has a narrower half-angle, which results in an illumination region 343, while LED 344 has a wider half-angle, which results in an illumination region 325. If receiver 350 detects a high reflectance for LED 342, but low reflectance for LED 344, then the object falls within the portion of illumination region 343 that is outside of illumination region 345 and the position of the object may be approximated in the vicinity shown by object 352. If receiver 350 receives the similar reflectance levels for LEDs 342 and 344, then the object falls within both illumination regions 343 and 345 and the position of the object may be approximated in the vicinity shown by object 354. If receiver 350 receives a high level of reflectance for LED 344, but low reflectance for LED 342, then falls within illumination region 345, but outside of region 343, and the position of the object may be approximated in the vicinity shown by object 356.

Note that if Z axis motion, e.g. motion towards or away from an LED described with respect to some of the embodiments above, is processed in an oversimplified manner, then, for example, an "on" function associated with detected movement toward the optical gesture recognition system may become confused by a following outward motion of moving a hand away from the system after the "on" motion. One solution is to move the hand away laterally in any direction after the inward "on" motion or move the hand toward the center cone laterally and then move it outward to indicate an "off" command. Alternatively, the processor performing gesture recognition may provide for a short latency period within which no further gestures or movements are identified to avoid conflicting commands.

The LED illumination region or cone position information, e.g. relative reflectance, shown in FIGS. 17-19 may be combined with motion detection, e.g. change in LED reflectance over time, to perform three dimensional control for such applications as an on-off switch, which may be useful in avoiding false "off" commands. With the narrow and wide cone dual LED approach shown in FIG. 19, it is possible to detect lateral motion near the receiver differently than motion toward or away from the center cone of the illumination regions 343, 345. A lateral motion away from the center occurs if the reflectance for the inner cone LED 342 drops strongly relatively to the wide cone reflectance for LED 344. The opposite changes in reflectance happen for an inward lateral motion. An increase above a fixed rate and above a minimum threshold for both LEDs 342, 344 indicates motion towards the center LED 342 while the opposite happens for motion outward. Far lateral motion is a non-issue since far objects reflect below detection level.

Cone motion detection as described with respect to FIG. 19 may be used for such applications as "virtual space" proximity on-off switches. Currently, most proximity sensors use a trigger motion concept. With this approach, any motion triggers a timer to turn on, for example, a security light, which later turns off after some time out value. On-off control with a trigger proximity sensor typically requires two proximity buttons where a user is required to wave hand over one corner of a light switch, for example, to trigger the switch "on" and wave a hand over another corner to trigger the switch "off". With a dual cone Z axis motion detector, a single dual cone LED port may act as an on-off switch without ambiguity. The dual cone concept can be implemented with the appropriate gesture comparison algorithm using the reflectances from two LEDs.

Referring again to FIG. 2, a touchless slider may be implemented using the receiver 22 and LEDs 24 and 26 positioned on the base 20. It is understood that a single LED and multiple receivers may be used, and that additional LEDs and/or receivers may be used in some embodiments. In the present example, the LEDs 24 and 26 are infrared LEDs and the receiver 22 is an infrared receiver, but other LED and corresponding detector types may be used.

Figure 20:
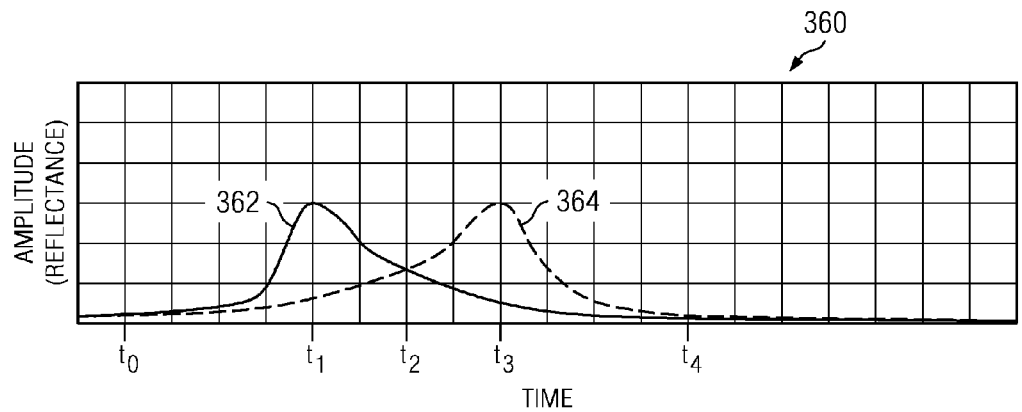
FIG. 20 is a graph illustrating response curves representing left/right or up/down movement of an object in an embodiment of an optical gesture recognition system in accordance with the present invention based on two light emitting diodes and an optical receiver.

With additional reference to FIG. 20, a graph 360 illustrates a response curve 362 and a response curve 364 as a function of amplitude (i.e., reflectance values) versus time. The response curve 362 represents a response of the LED 24 of FIG. 2 and the response curve 364 represents a response of the LED 26. For purposes of illustration, the LED 24 is the "left" LED and the LED 26 is the "right" LED as shown in FIG. 2. The response curves 362 and 364 of FIG. 20 illustrate a scenario in which the object 12 (e.g., a user's finger or hand) passes from left to right (e.g., scrolls) from a position at time t0 to a position at time t4 as illustrated in FIG. 20.

At times t0 and t4, the object 12 is out of range (e.g., the response of the receiver 22 is below a trigger threshold) and the response curves 362 and 364 are relatively flat with an amplitude of zero or near zero. It is understood that the zero level may not actually have a value of zero, but may be some offset value that serves as a baseline value against which the response curves 362 and 364 may be viewed. As the object 12 moves from the position at time t0 toward the right (i.e., towards the receiver 22 and LED 24), the response curve 362 increases until the object 12 is directly over the left LED 24 at time t1, where the response curve 362 reaches its peak amplitude. In the present example, the response curve 364 is also increasing as the object 12 moves right from time t0 due to overlapping projection areas of the LEDs 24 and 26. As the object 12 continues to move right, it moves directly over the receiver 22 at time t2. At time t2, the response curves 362 and 364 match each other at approximately half of their respective peak amplitudes, although such matching may not occur in some embodiments. Time t2 may represent a centerpoint of the slider formed by the receiver 22 and the two LEDs 24 and 26. It is understood that if the receiver 22 is offset relative to the LEDs 24 and 26 (e.g., closer to the LED 24 than the LED 26), the response curves 362 and 364 may not match each other at time t2. As the object 12 continues to move right, it moves directly over the right LED 26 at time t3, at which time the response curve 364 peaks and the response curve 362 has decreased from its peak. The response curves 362 and 364 then fall as the object 12 continues to move right after time t3 until they are again at an amplitude of zero or near zero at time t4.

It is noted that a peak to peak diagram of the response curves would begin with the object 12 positioned as shown in FIG. 3 (i.e., the peak of the response curve 362) and end with the object 12 positioned as shown in FIG. 4 (i.e., the peak of the response curve 364).

Accordingly, by measuring the reflectivity responses of the LEDs 24 and 26 (e.g., as amplitudes of the response curves 362 and 364), right to left and left to right motion may be detected. This motion may be viewed as corresponding to actuation of the touchless slider, with a particular position on the touchless slider corresponding to a particular amplitude of the response curves 362 and 364 and/or corresponding to a relative (e.g., comparative) amplitude of the response curves 362 and 364. With respect to relative amplitude, each point between the peaks of the response curves 362 and 364 is a ratio representing the location of the object 12 along the touchless slider.

One aspect of the present embodiment is that the slider formed by the receiver 22 and the two LEDs 24 and 26 may be capable of detecting the object 12 beyond the slider's endpoints, with the endpoints defined by the position of the LED 24 (at time t1 of FIG. 20) and LED 26 (at time t3 of FIG. 20). For example, as illustrated in FIG. 20, the response curves 362 and 364 both indicate movement between t0 and t1 and between t3 and t4. Accordingly, the slider may provide a greater range of motion than the range defined by the physical location of the LEDs 24 and 26. This additional range of motion may be defined, for example, by setting a particular amplitude level as the edge of the slider's range. Once the amplitude of one of the response curves 362 and 364 reaches that level, the slider may be considered active even though the object 12 is not between the LEDs 24 and 26. Therefore, the LEDs 24 and 26 (or receivers if there are multiple receivers with a single LED) may be viewed as reference points for determining motion and position of the object 12 rather than outer boundaries of the slider.

Figure 21:
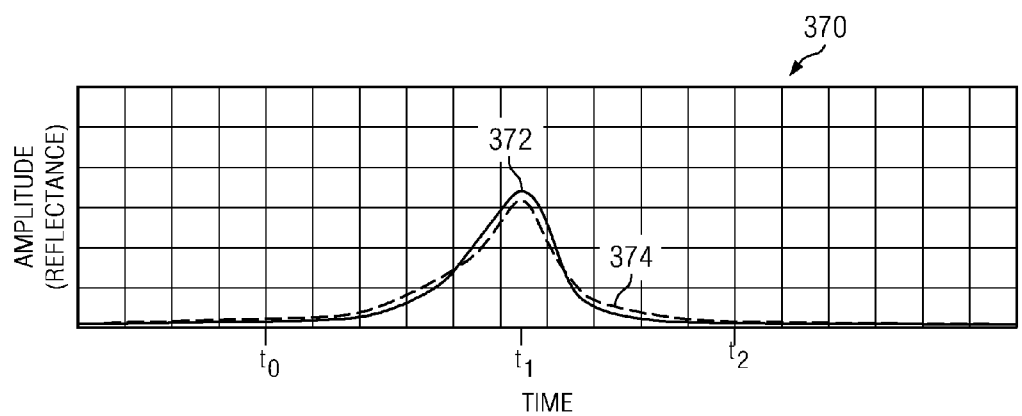
FIG. 21 is a graph illustrating response curves representing a "push" movement of a centrally positioned object in an embodiment of an optical gesture recognition system in accordance with the present invention based on two light emitting diodes and an optical receiver.

Referring again to FIG. 2 and with additional reference to FIG. 21, a graph 370 illustrates a response curve 372 and a response curve 374 as a function of amplitude (i.e., reflectance values) versus time. The response curve 372 represents the response of the LED 24 and the response curve 374 represents a response of the LED 26. For purposes of illustration, the LED 24 is the "left" LED and the LED 26 is the "right" LED as shown in FIG. 2. The response curves 372 and 374 of FIG. 21 illustrate a scenario in which the object 12 (e.g., a user's hand) approaches the touchless slider at approximately its center (e.g., above the receiver 22) from a point above the receiver 22 and "presses" an invisible point in the air above the slider. As the object 12 is approximately equidistant from the LEDs 24 and 26, the response curves 372 and 374 rise and fall at roughly equivalent rates, as described below.

At time t0, the object 12 is out of range (e.g., the response of the receiver 22 is below a trigger threshold) and the response curves 372 and 374 are relatively flat with an amplitude of zero or near zero. As the object 12 moves from the position at time t0 toward the receiver 22, the response curves 372 and 374 increase until the object 12 reaches the "bottom" of the movement representing pressing the invisible button, at which time the response curves 372 and 374 reach their peak amplitudes at time t1. As the object 12 releases the invisible button (e.g., moves away from the receiver 22), the response curves 372 and 374 decrease until they are relatively flat with an amplitude of zero or near zero at time t2. It is understood that if the receiver 22 is offset relative to the LEDs 24 and 26 (e.g., closer to the LED 24 than the LED 26), the response curves 372 and 374 may not correspond as closely as shown at time t1.

Accordingly, by measuring the responses of the LEDs 24 and 26 (e.g., as amplitudes of the response curves 372 and 374), vertical motion (i.e., motion towards and away from the touchless slider) may be detected. This motion may be viewed as corresponding to actuation of a button, with a particular position of the button corresponding to a particular amplitude of the response curves 362 and 364. The positions may be as simple as different amplitude levels representing "on" and "off," or may be more complicated with varying amplitude levels representing varying "depths" of button actuation.

Figure 22:
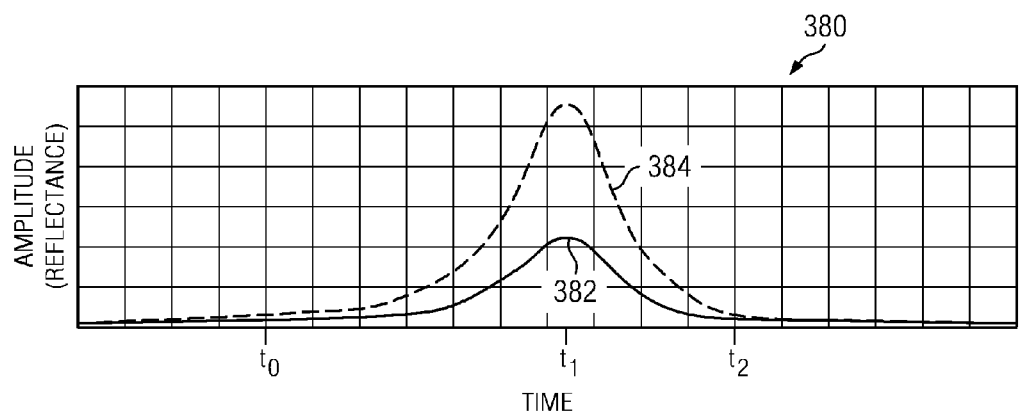
FIG. 22 is a graph illustrating response curves representing a "push" movement of an offset object in an embodiment of an optical gesture recognition system in accordance with the present invention based on two light emitting diodes and an optical receiver.

With additional reference to FIG. 22, a graph 380 illustrates a response curve 382 and a response curve 384 as a function of amplitude (i.e., reflectance values) versus time. The response curve 382 represents a response of the LED 24 and the response curve 384 represents a response of the LED 26. For purposes of illustration, the LED 24 is the "left" LED and the LED 26 is the "right" LED as shown in FIG. 2. The response curves 382 and 384 of FIG. 22 illustrate a scenario in which the object 12 (e.g., a user's hand) approaches the touchless slider in the same manner as described above with respect to FIG. 21, but at a point between the receiver 22 and the LED 26 rather than directly over the receiver 22. As the object 12 is nearer to the LED 26 than to the LED 24, the response curve 384 has a larger amplitude than the response curve 382 at time t1.

Accordingly, the graph 380 illustrates that a horizontal position of the button press of FIG. 21 may be determined along the touchless slider based on the relative amplitudes of the response curves 382 and 384. Although not shown, it is understood that the object 12 may be retracted without first pushing. Following the retraction, the object 12 may be pushed or the retraction itself may serve as a trigger.

Figure 23:
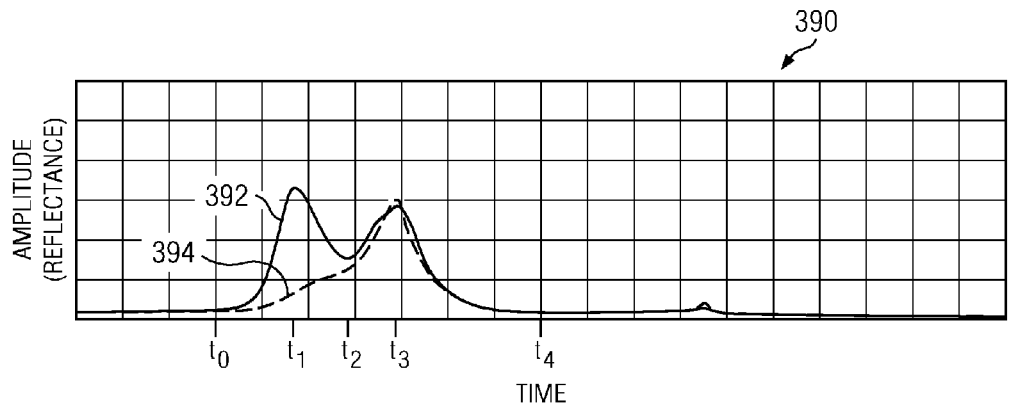
FIG. 23 is a graph illustrating response curves representing left to right movement and a "push and retract" movement of an object in an embodiment of an optical gesture recognition system in accordance with the present invention based on two light emitting diodes and an optical receiver.

Referring again to FIG. 2 and with additional reference to FIG. 23, a graph 390 illustrates a response curve 392 and a response curve 394 as a function of amplitude (i.e., reflectance values) versus time. The response curve 392 represents the response of the LED 24 and the response curve 394 represents a response of the LED 26. For purposes of illustration, the LED 24 is the "left" LED and the LED 26 is the "right" LED as shown in FIG. 2. The response curves 392 and 394 of FIG. 23 illustrate a scenario in which the object 12 (e.g., a user's hand) moves horizontally from left to right (e.g., scrolls) and then presses the invisible button described with respect to FIG. 21 before retracting. Accordingly, the graph 390 illustrates a combination of the horizontal movement (e.g., along an axis of the touchless slider) element of FIG. 20 with the vertical invisible button movement of FIGS. 21 and 22.

At time t0, the object 12 is out of range (e.g., the response of the receiver 22 is below a trigger threshold) and the response curves 392 and 394 are relatively flat with an amplitude of zero or near zero. As the object 12 moves from the position at time t0 toward the right (i.e., towards the LED 24 and receiver 22), the response curve 392 increases until the object 12 is directly over the left LED 24 at time t1, where the response curve 392 reaches its peak amplitude. In the present example, the response curve 394 is also increasing as the object 12 moves right from time t0 due to overlapping projection areas of the LEDs 24 and 26. As the object 12 continues to move right, the response curve 392 decreases and the response curve 394 increases.

At time t2, both of the response curves 392 and 394 begin to rise, indicating vertical movement towards the touchless slider (e.g., a button push). The bottom of the button push is indicated by the peaks of the response curves 392 and 394 at time t3. As the object 12 is retracted, the response curves 392 and 394 fall until they are again at an amplitude of zero or near zero at time t4. The selected horizontal location of the touchless slider occurs at time t2, where the response curve 392 begins to rise in response to the button push.

Accordingly, as illustrated by FIG. 23, a user may use a horizontal movement to select a position on the touchless slider and then use a vertical movement to indicate the push of a button. The button push may be used to indicate the user's acceptance of the horizontal slider position, to actuate a feature that uses the slider position as input, or to perform any other desired function. In some embodiments, the button push may be unrelated to the horizontal slider position. In addition or in place of the push, the user may retract the object 12.

Figure 24:
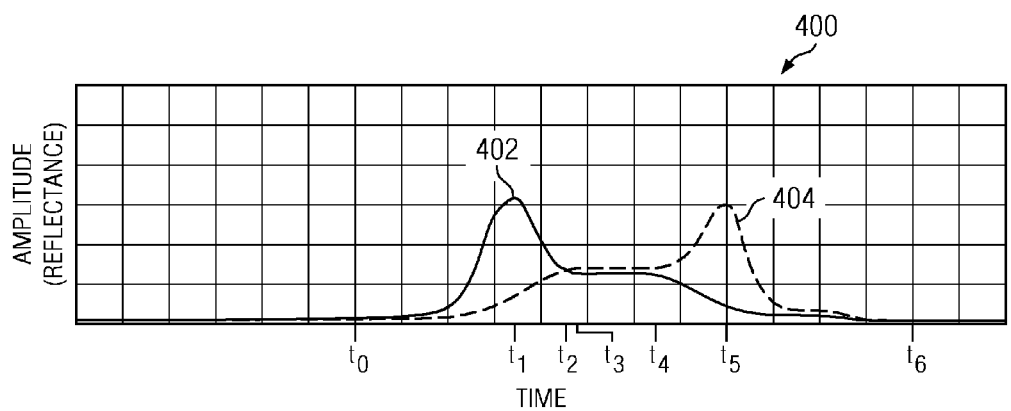
FIG. 24 is a graph illustrating response curves representing left to right movement of an object with a pause during the movement in an embodiment of an optical gesture recognition system in accordance with the present invention based on two light emitting diodes and an optical receiver.

Referring again to FIG. 2 and with additional reference to FIG. 24, a graph 400 illustrates a response curve 402 and a response curve 404 as a function of amplitude (i.e., reflectance values) versus time. The response curve 402 represents the response of the LED 24 and the response curve 404 represents a response of the LED 26. For purposes of illustration, the LED 24 is the "left" LED and the LED 26 is the "right" LED as shown in FIG. 2. The response curves 402 and 404 of FIG. 24 illustrate a scenario in which the object 12

(e.g., a user's hand) moves horizontally from left to right (e.g., scrolls), pauses, and then continues its left to right movement.

At time t0, the object 12 is out of range (e.g., the response of the receiver 22 is below a trigger threshold) and the response curves 402 and 404 are relatively flat with an amplitude of zero or near zero. As the object 12 moves from the position at time t0 toward the right (i.e., towards the LED 24 and receiver 22), the response curve 402 increases until the object 12 is directly over the left LED 24 at time t1, where the response curve 402 reaches its peak amplitude. In the present example, the response curve 404 is also increasing as the object 12 moves right from time t0 due to overlapping projection areas of the LEDs 24 and 26. As the object 12 continues to move right, the response curve 402 decreases and the response curve 404 increases.

As the object 12 continues to move right, it moves directly over the receiver 22 at time t2. At time t2, the response curves 402 and 404 match each other at approximately half of their respective peak amplitudes. In the present example, the object 12 moves past the receiver 22 (as indicated by the difference in amplitudes at time t3) and then pauses. This pause is indicated by the flattening of the response curves 402 and 404 between times t3 and t4. During this paused time, the amplitudes of both response curves 402 and 404 remain substantially unchanged, indicating that there is neither horizontal nor vertical movement of the object 12. At time t4, the pause ends and the object 12 continues to move right until it moves directly over the right LED 26 at time t5, at which time the response curve 404 peaks and the response curve 402 continues to decrease. The response curves 402 and 404 then fall as the object 12 continues to move right after time t5 until they are again at an amplitude of zero or near zero at time t6.

It is understood that many different possible motions may be identified using the combinations of sliding, pushing/retracting, and pausing described in the preceding embodiments. For example, a user may choose to pause over the desired horizontal location and either press, retract, or continue sliding. Furthermore, for a given application, the location of the pause may represent a desired slider set-point when a continuation of the slide occurs.

Figure 25:
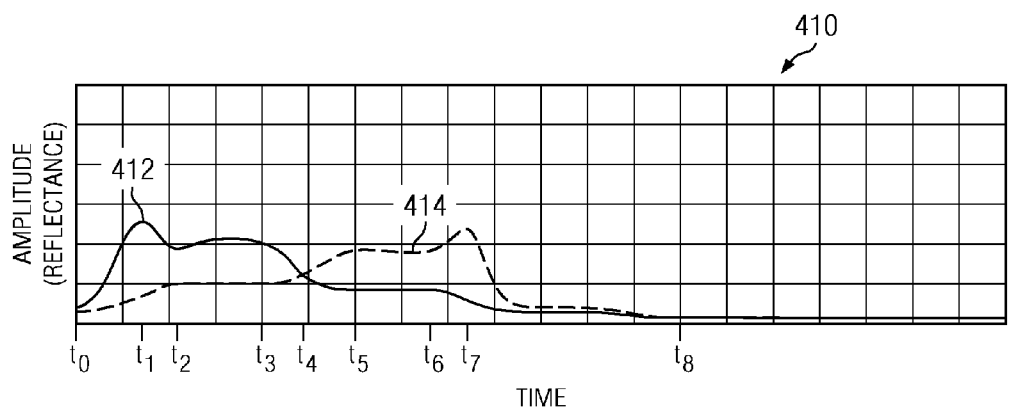
FIG. 25 is a graph illustrating response curves representing left to right movement of an object with multiple pauses during the movement in an embodiment of an optical gesture recognition system in accordance with the present invention based on two light emitting diodes and an optical receiver.

Referring again to FIG. 2 and with additional reference to FIG. 25, a graph 410 illustrates a response curve 412 and a response curve 414 as a function of amplitude (i.e., reflectance values) versus time. The response curve 412 represents the response of the LED 24 and the response curve 414 represents a response of the LED 26. For purposes of illustration, the LED 24 is the "left" LED and the LED 26 is the "right" LED as shown in FIG. 2. The response curves 412 and 414 of FIG. 24 illustrate a scenario in which the object 12 (e.g., a user's hand) moves horizontally from left to right, pauses, continues its left to right movement, pauses again, and then continues its left to right movement. The multiple pauses may indicate, for example, multiple set-points.

At time t0, the object 12 is entering the range of the LEDs 24 and 26, and the response curves 412 and 414 are increasing. As the object 12 moves from the position at time t0 toward the right (i.e., towards the LED 24 and receiver 22), the response curve 412 increases until the object 12 is directly over the left LED 24 at time t1, where the response curve 412 reaches its peak amplitude. In the present example, the response curve 414 is also increasing as the object 12 moves right from time t0 due to overlapping projection areas of the LEDs 24 and 26. As the object 12 continues to move right, the response curve 412 decreases and the response curve 414 increases.

From time t2 until time t3, the object 12 pauses as indicated by the flattening of the response curves 412 and 414. Although the response curve 412 illustrates a slight increase in amplitude during this time that might indicate a slight vertical change in position, this change is below a trigger threshold in the present example, and does not constitute a button push. It is noted that the relatively small change in amplitude of the response curve 412 during this time is not reflected by a similar change in the response curve 414, which may be due to the current position of the object 12 being much closer to the LED 24 than the LED 26 at this point in time. As this illustrates, various mechanisms (e.g., hysteresis) may be used to ensure that small changes in amplitude are not interpreted incorrectly.

At time t3, the pause ends and the object 12 continues to move right until it is directly over the receiver 22 at time t4. At time t4, the response curves 412 and 414 match each other at approximately half of their respective peak amplitudes. In the present example, the object 12 moves past the receiver 22 towards the LED 26 and then pauses again from time t5 until time t6. At time t6, the pause ends and the object 12 continues to move right until it moves directly over the right LED 26 at time t7, at which time the response curve 414 peaks and the response curve 412 continues to decrease. The response curves 412 and 414 then fall as the object 12 continues to move right after time t7 until they are at an amplitude of zero or near zero at time t8.

Figure 26:
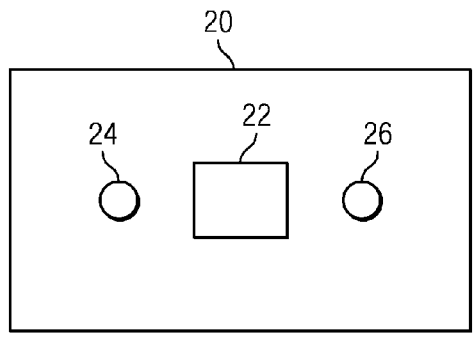
FIG. 26 is a topview diagram of an embodiment of an optical gesture recognition system in accordance with the present invention based on two light emitting diodes and an optical receiver positioned along a single axis.
Figure 27:
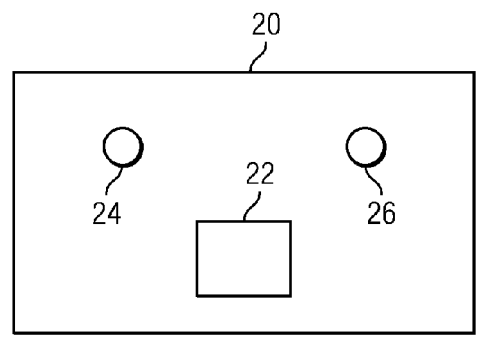
FIG. 27 is a topview diagram of an embodiment of an optical gesture recognition system in accordance with the present invention based on two light emitting diodes positioned along an axis and an optical receiver offset from the axis.

Referring to FIGS. 26 and 27, it is understood that the receiver 22 and LEDs 24 and 26 (or a single LED and multiple receivers) may be positioned differently in various embodiments. For example, FIG. 26 illustrates the receiver 22 and LEDs 24 and 26 positioned along a single axis. FIG. 27 illustrates an alternative embodiment where the receiver 22 is offset from the LEDs 24 and 26, which are both positioned on a single axis. Other embodiments may have the receiver 22 and LEDs 24 and 26 all on separate axes, or may have the receiver 22 and one of the LEDs 24 and 26 on a single axis and the other LED may be offset from the axis. Accordingly, it is understood that many different configurations of the receiver 22 and LEDs 24 and 26 may be used to implement aspects of the present disclosure.

Figure 28:
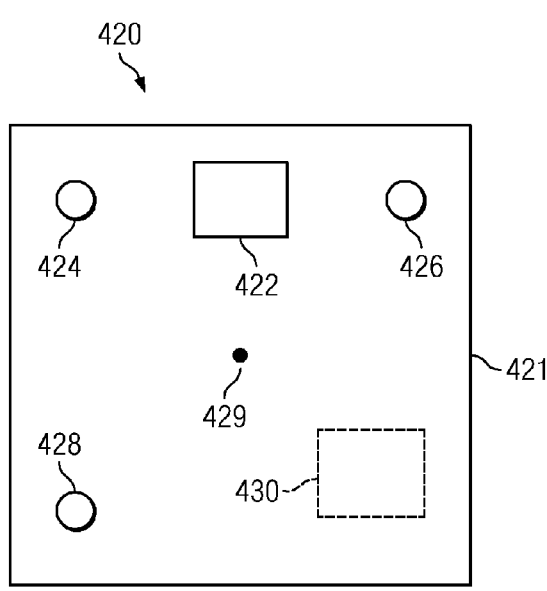
FIG. 28 is a topview diagram of an embodiment of an optical gesture recognition system in accordance with the present invention based on three light emitting diodes and an optical receiver.

Referring to FIG. 28, a topview diagram is provided of one embodiment of a radial slider 420 (e.g., a touchless dial or other circular motion sensor) that may be implemented using a receiver 422 and LEDs 424, 426, and 428 positioned on a base 421. It is understood that a single LED and multiple receivers may be used, and that additional LEDs and/or receivers may be used in some embodiments. In the present example, the LEDs 424, 426, and 428 are infrared LEDs and the receiver 422 is an infrared receiver, but other LED and corresponding detector types may be used. The LEDs 424, 426, and 428 are positioned in an 'L' shape with the sensor 422 positioned between the LEDs 424 and 426, with each of the three LEDs being located approximately on a corner of an imaginary square. It is understood that many other configurations are possible and that the positioning of the LEDs 424, 426, and 428 relative to the imaginary square is used only for purposes of illustration. Although a fixed location 429 located substantially in the middle of the imaginary square is used in the present embodiment for purposes of example, it is understood that the fixed location may be located elsewhere on the base 421. Various motions and gestures of an object 430 relative to the LEDs 424, 426, and 428 may be recognized by the radial slider 420.

The radial slider 420 may provide recognition for many different types of movements and gestures. For example, the radial slider 420 may recognize circular motions in both clockwise and counterclockwise directions. Furthermore, the radial slider 420 may provide "click wheel" functionality by recognizing pause, set, and retract movements as described previously. In some embodiments, the radial slider 420 may recognize a gesture provided by a spiral motion that is either in a single plane or in multiple planes (e.g., towards or away from the receiver 422 and LEDs 424, 426, and 428). Example of motions that may be recognized by the radial slider include clockwise and counterclockwise spirals, clockwise spirals in or out (e.g., towards or away from the receiver 422 and LEDs 424, 426, and 428), and counterclockwise spirals in or out. In addition to these relatively complex movements, the radial slider 420 may also recognize simpler movements described previously, such as a left/right or up/down scrolling movement in a single axis. Combinations of movements may also be recognized, such as a clockwise movement followed by or combined with a scrolling movement.

Figure 29:
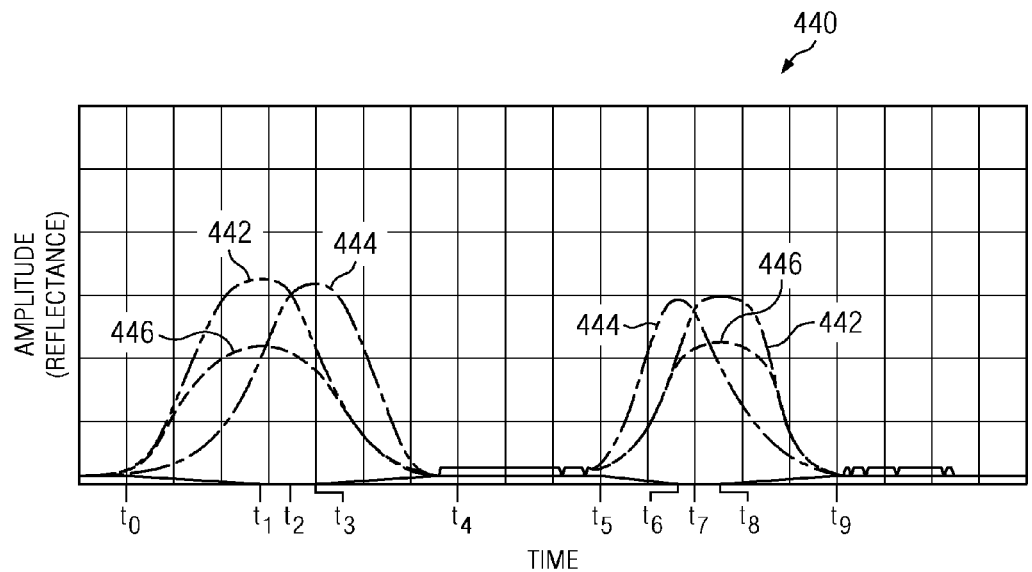
FIG. 29 is a graph illustrating response curves representing left/right or up/down movement of an object in an embodiment of an optical gesture recognition system in accordance with the present invention based on three light emitting diodes and an optical receiver.

With additional reference to FIG. 29, a graph 440 illustrates a response curve 442, a response curve 444, and a response curve 446 as a function of amplitude (i.e., reflectance values) versus time. The response curve 442 represents a response of the LED 424 of FIG. 28, the response curve 444 represents a response of the LED 426, and the response curve 446 represents a response of the LED 428. The response curves 442, 444, and 446 of FIG. 29 illustrate a scenario in which the object 430 (e.g., a user's finger or hand) passes from left to right and then from right to left across the LEDs 424, 426, and 428 from a position at time t0 to a position at time t9.

At time t0, the object 430 is out of range (e.g., the response of the receiver 422 is below a trigger threshold) and the response curves 442, 444, and 446 are relatively flat with an amplitude of zero or near zero. As the object 430 moves from the position at time t0 towards the right (i.e., towards the LEDs 424, 428 and receiver 22), the response curves 442 and 446 increase until the object 430 is directly over the LEDs 424 and 428 at time t1. At time t1, the response curves 442 and 446 peak. It is noted that the object 430 may be tilted or angled with a portion of the object 430 closer to the LED 424 than to the LED 428 (e.g., the user's fingertip may be closer to the LED 424 than the user's hand is to the LED 428). This tilt may result in a higher amplitude of the response curve 442 compared to the amplitude of the response curve 446. In the present example, the response curve 444 is also increasing as the object 430 moves right from time t0 due to overlapping projection areas of the LEDs 424, 426, and 428. As the object 430 continues to move right, the response curves 442 and 446 decrease and the response curve 444 increases.

As the object 430 continues to move right, it moves directly over the receiver 422 at time t2. In the present example, this occurs when the response curves 442 and 444 cross one another, but this crossing may not occur at this time in all embodiments. As the object 430 continues to move right, it moves directly over the LED 426 at time t3, at which time the response curve 444 peaks and the response curves 442 and 446 continue to decrease. The response curves 442, 444, and 446 then fall as the object 430 continues to move right after time t3 until they are again at an amplitude of zero or near zero at time t4.

Starting at time t5, the previous left to right movement is reversed and the object 430 moves back across the LEDs 424, 426, and 428 from right to left. At time t5, the object 430 is out of range (e.g., the response of the receiver 422 is below a trigger threshold) and the response curves 442, 444, and 446 are relatively flat with an amplitude of zero or near zero. As the object 430 moves from the position at time t5 towards the left (i.e., towards the LED 426 and receiver 22), the response curve 444 increases until the object 430 is directly over the LED 426 at time t6, at which time the response curve 444 peaks. In the present example, the response curves 442 and 446 are also increasing as the object 430 moves left from time t5 due to overlapping projection areas of the LEDs 424, 426, and 428. As the object 430 continues to move left, the response curve 444 decreases and the response curves 442 and 446 continue to increase.

As the object 430 continues to move left from time t6, it moves directly over the receiver 422 at time t7. As the object 430 continues to move left from time t7, it moves directly over the LEDs 424 and 428 at time t8, at which time the response curves 442 and 446 peak and the response curve 444 has decreased from its peak. The response curves 442, 444, and 446 then fall as the object 430 continues to move left after time t8 until they are again at an amplitude of zero or near zero at time t9.

Accordingly, left/right and right/left movements may be recognized by the radial slider 420. Similarly up/down and down/up movements may be recognized, as may movements at angles across the LEDs 424, 426, and 428 (e.g., approaching from one corner, such as the LED 424). Although not shown, other movements such as push, set, and retract may also be incorporated as described previously.

Figure 30:
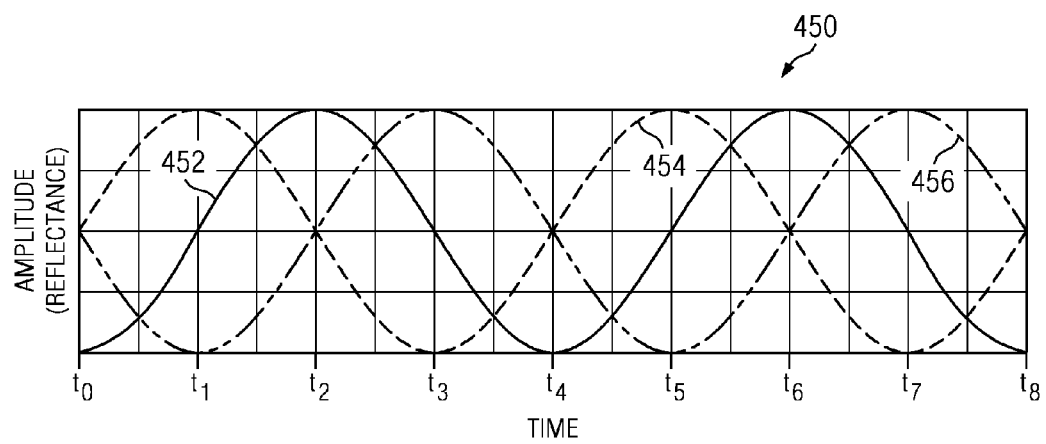
FIG. 30 is a graph illustrating response curves representing clockwise or counterclockwise movement of an object in an embodiment of an optical gesture recognition system in accordance with the present invention based on three light emitting diodes and an optical receiver.

With additional reference to FIG. 30, a graph 450 illustrates a response curve 452, a response curve 454, and a response curve 456 as a function of amplitude (i.e., reflectance values) versus time. The response curve 452 represents a response of the LED 424 of FIG. 28, the response curve 454 represents a response of the LED 426, and the response curve 456 represents a response of the LED 428. The response curves 452, 454, and 456 of FIG. 30 illustrate a scenario in which the object 430 (e.g., a user's finger or hand) passes in a counter-clockwise manner around the LEDs 424, 426, and 428 from a position at time t0 to a position at time t8.

In the present example of FIG. 30, the object 430 is within range of at least one of the LEDs 424, 426, and 428 at all times. For purposes of example, the object 430 is described as moving across each of the LEDs 424, 426, and 428 in turn as though the object 430 is rotating around the fixed point 429. It is understood that the response curves 452, 454, and 456 may represent a simplified response to the object 430 for purposes of illustration, and that the actual response curves may be more complex than shown in FIG. 30 when replicating circular motion.

At time t0, the object 430 is undergoing counterclockwise rotation and is in the "empty" corner of the imaginary square formed by the L shaped arrangement of the LEDs 424, 426, and 428 with the LEDs located in the other three corners. At this time, the response curve 452 is at an amplitude of near zero or zero as the object 430 is at the most distant point from the LED 424 in its counterclockwise rotation. The response curve 454 is increasing as the object 430 moves towards the LED 426, and the response curve 456 is decreasing as the object 430 moves away from the LED 428.

As the object 430 moves from the position at time t0 in a counterclockwise direction (i.e., towards the LED 426), the response curves 452 and 454 increase until the object 430 is directly over the LED 426 at time t1. At time t1, the response curve 454 peaks, the response curve 452 is increasing as the object 430 moves towards the LED 424, and the response curve 456 is at an amplitude of near zero or zero as the object 430 is at the most distant point from the LED 428 in its counterclockwise rotation.

As the object 430 moves from the position at time t1 in a counterclockwise direction (i.e., towards the LED 424), the response curves 452 and 456 increase until the object 430 is directly over the LED 424 at time t2. At time t2, the response curve 452 peaks, the response curve 456 is increasing as the object 430 moves towards the LED 428, and the response curve 454 is decreasing as the object 430 moves away from the LED 426.

As the object 430 moves from the position at time t2 in a counterclockwise direction (i.e., towards the LED 428), the response curve 456 increases until the object 430 is directly over the LED 428 at time t3. At time t3, the response curve 456 peaks, the response curve 452 is decreasing as the object 430 moves away from the LED 424, and the response curve 454 is at an amplitude of near zero or zero as the object 430 is at the most distant point from the LED 426 in its counterclockwise rotation.

As the object 430 moves from the position at time t3 in a counterclockwise direction (i.e., towards the empty corner of the partial square), the response curve 456 is decreasing as the object 430 moves away from the LED 428, the response curve 454 is increasing as the object 430 moves towards the LED 426, and the response curve 452 is at an amplitude of near zero or zero as the object 430 is at the most distant point from the LED 424 in its counterclockwise rotation.

As illustrated in FIG. 30, this counterclockwise movement may continue with the response curves 452, 454, and 456 repeating with times t0=t4=t8, t1=t5, t2=t6, and t3=t7 for purposes of illustration. Although not shown, the movement of the object 430 may be recognized by the radial slider 420 in both clockwise and counterclockwise directions. In addition, spiraling movements may occur in a single plane or in/out from the base 421, as may other movements such as push, set, and retract.

It is understood that various numbers of LEDs and/or receivers may be used to provide additional resolution and/or to detect many different motions in both the horizontal and/or vertical planes, including circles (e.g., representing dials), sliders, and buttons. Furthermore, motions may incorporate both horizontal and vertical elements simultaneously (e.g., sliding while pushing a button). Such motions may range from simple one or two-dimensional movements to complex three dimensional movements depending on the environment and the particular application. For example, interaction with a hot cook-top may use relatively simple motions such as sliders, buttons, and dials, while operating more complex devices may use additional motions that require relatively complicated three dimensional sensing to determine, for example, the positioning of a robotic arm. Accordingly, it is understood that the concepts described herein may be used in many different environments and may be combined in many different ways.

In some embodiments, visual and/or audible feedback may be provided to a user. For example, as the user moves his or her finger left to right across the touchless slider, a row of visible LEDs positioned on the bases 20, 421 or elsewhere may light to indicate the current position of the slider. Such feedback provides the user with information regarding the slider's current setting and therefore may allow the user more closely manage his or her interaction with the slider. It is understood that many different types of feedback may be provided and the means for providing such feedback may vary based on such factors as the amount of room available on the base 20, the level of control needed for a particular application (e.g., higher levels of control may require higher resolution feedback), and the environment in which the application is being used (e.g., a loud environment may minimize the effectiveness of audible feedback).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method for gesture recognition in an optical system using a touchless slider having first and second reference points positioned along an axis, the method comprising:
    obtaining a plurality of first reflectance values by measuring an amplitude of light reflected from an object relative to the first reference point, wherein each first reflectance value corresponds to a different point in time and wherein the object does not contact the first reference point;
    obtaining a plurality of second reflectance values by measuring an amplitude of light reflected from the object relative to the second reference point, wherein each second reflectance value corresponds to a different point in time and wherein the object does not contact the second reference point;
    comparing the plurality of first and second reflectance values to identify a plurality of ratio values between the first reflectance values and the second reflectance values, wherein each of the plurality of ratio values corresponds to one of the points in time; and
    determining at least one of a position and a direction of movement of the object relative to the first and second reference points based on the identified plurality of ratio values.

2. The method of claim 1 wherein the direction of movement is limited to movement along the axis.

3. The method of claim 2 wherein obtaining the plurality of first reflectance values includes amplitude measurements taken when the object is on either side of the first reference point.

4. The method of claim 1 further comprising:
    identifying a plurality of consecutive first reflectance values that are substantially identical;
    identifying a plurality of consecutive second reflectance values that are substantially identical; and
    determining that the motion of the object has paused based on the substantially identical reflectance values.

5. The method of claim 1 further comprising:
  identifying a first peak value from a plurality of consecutive first reflectance values;
  identifying a second peak value from a plurality of consecutive second reflectance values, wherein the first and second peak values occur simultaneously; and
  detecting that the object has moved perpendicularly relative to the axis based on the simultaneously occurring first and second peak values.

6. The method of claim 5 further comprising defining the determined position as a user defined setting of the touchless slider when the perpendicular movement is detected.

7. The method of claim 1 further comprising providing feedback indicating at least one of the position and the direction of movement of the object.

8. The method of claim 7 wherein providing the feedback includes actuating a plurality of visible light emitting diodes in response to the movement of the object relative to the first and second reference points.

9. The method of claim 1 wherein the first and second reference points are light emitting diodes.

10. The method of claim 1 wherein the first and second reference points are optical receivers.

11. A method for gesture recognition in an optical system using a touchless slider having first and second reference points positioned on an axis, the method comprising:
  identifying movement of an object relative to the first reference point along the axis, wherein the movement is identified based on a plurality of first amplitude values each representing a distance of the object relative to the first reference point at a given point in time, wherein the distance is greater than zero;
  identifying movement of the object relative to the second reference point along the axis, wherein the movement is identified based on a plurality of second amplitude values each representing a distance of the object relative to the second reference point at a given point in time, wherein the distance is greater than zero;
  comparing the plurality of first and second amplitude values at matching points in time to identify movement of the object in a first direction substantially parallel to the axis; and
  detecting a simultaneous peak in the plurality of first and second amplitude values to identify movement of the object in a second direction substantially perpendicular to the axis.

12. The method of claim 11 further comprising obtaining the plurality of first and second amplitude values by measuring an amplitude of light reflected from the object relative to the first and second reference points, respectively.

13. The method of claim 11 wherein the movement of the object in the second direction is interpreted by the optical system as a button push.

14. The method of claim 13 wherein the button push is interpreted as setting a position of the object along the axis relative to the first and second reference points at a position occupied by the object when the button push occurred.

15. The method of claim 11 further comprising:
  identifying a plurality of the first amplitude values that are substantially identical for a consecutive number of points in time;
  identifying a plurality of second amplitude values that are substantially identical for the consecutive number of points in time; and
  determining that the movement of the object has paused for a period of time defined by the consecutive number of points in time based on the substantially identical first and second amplitude values.

16. The method of claim 15 further comprising identifying the pause as a set point.

17. The method of claim 11 further comprising providing user detectable feedback of the identified movement in at least one of the first and second directions.

18. A touchless slider comprising:
  first and second reference points positioned along an axis;
  means for obtaining a plurality of first reflectance values by measuring an amplitude of light reflected from an object relative to the first reference point, wherein each first reflectance value corresponds to a different point in time;
  means for obtaining a plurality of second reflectance values by measuring an amplitude of light reflected from the object relative to the second reference point, wherein each second reflectance value corresponds to a different point in time;
  means for comparing the plurality of first and second reflectance values to identify a plurality of ratio values between the first reflectance values and the second reflectance values, wherein each of the plurality of ratio values corresponds to one of the points in time; and
  means for determining at least one of a position and a direction of movement of the object relative to the first and second reference points based on the identified plurality of ratio values.

19. The touchless slider of claim 18 further comprising:
  means for identifying a plurality of consecutive first reflectance values that are substantially identical in amplitude for a period of time;
  means for identifying a plurality of consecutive second reflectance values that are substantially identical in amplitude for the period of time; and
  means for determining that the motion of the object has paused based on the substantially identical amplitudes of the reflectance values for the period of time.

20. The touchless slider of claim 18 further comprising:
  means for identifying a first peak value from a plurality of consecutive first reflectance values;
  means for identifying a second peak value from a plurality of consecutive second reflectance values, wherein the first and second peak values occur simultaneously; and
  means for detecting that the object has moved perpendicularly relative to the axis based on the simultaneously occurring first and second peak values.

21. A method for gesture recognition in an optical system using a touchless slider having first, second, and third reference points positioned around a fixed location, the method comprising:
  obtaining a plurality of first reflectance values by measuring an amplitude of light reflected from an object relative to the first reference point while the object is a variable distance that is greater than zero from the first reference point, wherein each first reflectance value corresponds to a different point in time;
  obtaining a plurality of second reflectance values by measuring an amplitude of light reflected from the object relative to the second reference point while the object is a variable distance that is greater than zero from the second reference point, wherein each second reflectance value corresponds to a different point in time;
  obtaining a plurality of third reflectance values by measuring an amplitude of light reflected from the object relative to the third reference point while the object is a variable distance that is greater than zero from the third reference point, wherein each third reflectance value corresponds to a different point in time;

comparing the plurality of first, second, and third reflectance values to identify a plurality of ratio values between the first, second, and third reflectance values, wherein each of the plurality of ratio values corresponds to one of the points in time; and determining at least one of a position and a direction of movement of the object relative to the first, second, and third reference points based on the identified plurality of ratio values.

22. The method of claim 21 wherein the direction of movement is one of clockwise or counterclockwise around the fixed location.

23. The method of claim 22 wherein the direction of movement includes a spiral motion relative to the fixed location, wherein the spiral motion alters a distance between the first, second, and third reference points and the fixed location.

24. The method of claim 21 wherein the direction of movement is along a single axis.

25. The method of claim 21 wherein at least two of the first, second, and third reference points are equidistant from the fixed location.

* * * * *